(12) United States Patent
Nitta et al.

(10) Patent No.: US 8,516,491 B2
(45) Date of Patent: Aug. 20, 2013

(54) MULTI-CORE PROCESSOR

(75) Inventors: Daisuke Nitta, Kawasaki (JP);
Tomonori Kumagai, Kawasaki (JP);
Kazunari Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1258 days.

(21) Appl. No.: 12/049,509

(22) Filed: Mar. 17, 2008

(65) Prior Publication Data
US 2008/0168466 A1 Jul. 10, 2008

Related U.S. Application Data

(63) Continuation of application No. PCT/JP2005/017958, filed on Sep. 29, 2005.

(51) Int. Cl.
*G06F 9/46* (2006.01)

(52) U.S. Cl.
USPC .............................. 718/105; 718/102; 718/104

(58) Field of Classification Search
None
See application file for complete search history.

(56) References Cited

U.S. PATENT DOCUMENTS

| | | | | |
|---|---|---|---|---|
| 5,630,129 | A * | 5/1997 | Wheat | 718/105 |
| 5,924,097 | A * | 7/1999 | Hill et al. | 707/703 |
| 2004/0117794 | A1 | 6/2004 | Kundu | |
| 2005/0055504 | A1* | 3/2005 | Hass et al. | 711/122 |
| 2006/0053424 | A1* | 3/2006 | Koistinen et al. | 718/105 |
| 2008/0043622 | A1* | 2/2008 | Kamath et al. | 370/235 |

FOREIGN PATENT DOCUMENTS

| | | |
|---|---|---|
| JP | 5-324593 | 12/1993 |
| JP | 7-152699 | 6/1995 |
| JP | 2000-259590 | 9/2000 |
| JP | 2002-117011 | 4/2002 |
| JP | 2004-199678 | 7/2004 |

OTHER PUBLICATIONS

Taniar et al. A High Performance Object-Oriented Distributed Parallel Database Architecture. [online] (Apr. 21, 1998). Springer, pp. 498-507. Retrieved From the Internet <http://www.springerlink.com/content/x23400m7kg777270/>.*

International Search Report dated Dec. 6, 2005, from the corresponding International Application.

Notification of Reason for Rejection dated Apr. 27, 2010, from the corresponding Japanese Application.

* cited by examiner

*Primary Examiner* — Emerson C Puente
*Assistant Examiner* — Jonathan R Labud
(74) *Attorney, Agent, or Firm* — Katten Muchin Rosenman LLP

(57) ABSTRACT

An algorithm in a multi-core processor having a plurality of cores for deciding processing allocation to each core to distribute the processing load thereof, and an efficient processing allocation algorithm simplified for software engineers are established. In order to achieve the above processing load distribution, the multi-core processor includes a plurality of basic modules divided into minimum configuration units, each having a uniform input/output format interface, so as to perform required processing contents in the overall processor. As an initial allocation, the above plurality of basic modules are allocated in distribution to the above plurality of cores, and subsequently, based on functional information of each core, the above plurality of initially allocated basic modules are relocated either periodically or at appropriate timing.

9 Claims, 45 Drawing Sheets

FIG.23

| Object core No.: 2 |
|---|
| Module transmission permission to the input source core side: permitted |
| Module reception permission from the input source core side: inhibited |
| Module transmission permission to the output destination core side : permitted |
| Module reception permission from the output destination core side: inhibited |
| Execution/non-execution of module saving into another core side: no |

FIG.24A

| | |
|---|---|
| Object core: | :1 |
| Reception buffer input amount | :500 kbytes |
| Reception buffer output amount | :400 kbytes |
| Transmission buffer input amount | :500 kbytes |
| Transmission buffer output amount | :400 kbytes |
| Overall core use rate | :80% |
| Use rate of module 1 | :60% |
| Use rate of module 2 | :20% |
| Overall core data size | :1200 kbytes |
| Overall core idle data capacity | :800 kbytes |
| Data size of module 1 | :600 kbytes |
| Data size of module 2 | :600 kbytes |

FIG.24B

| | |
|---|---|
| Object core | : 2 |
| Reception buffer input amount | 500 kbytes |
| Reception buffer output amount | 400 kbytes |
| Transmission buffer input amount | 500 kbytes |
| Transmission buffer output amount | 400 kbytes |
| Overall core use rate | 70 % |
| Use rate of module 3 | 45 % |
| Use rate of module 4 | 25 % |
| Overall core data size | 1200 kbytes |
| Overall core idle data capacity | 800 kbytes |
| Data size of module 3 | 800 kbytes |
| Data size of module 4 | 400 kbytes |

FIG.24C

| | |
|---|---|
| Object core | : 3 |
| Reception buffer input amount | 500 kbytes |
| Reception buffer output amount | 600 kbytes |
| Transmission buffer input amount | 500 kbytes |
| Transmission buffer output amount | 400 kbytes |
| Overall core use rate | 50 % |
| Use rate of module 5 | 30 % |
| Use rate of module 6 | 20 % |
| Overall core data size | 1200 kbytes |
| Overall core idle data capacity | 800 kbytes |
| Data size of module 5 | 600 kbytes |
| Data size of module 6 | 600 kbytes |

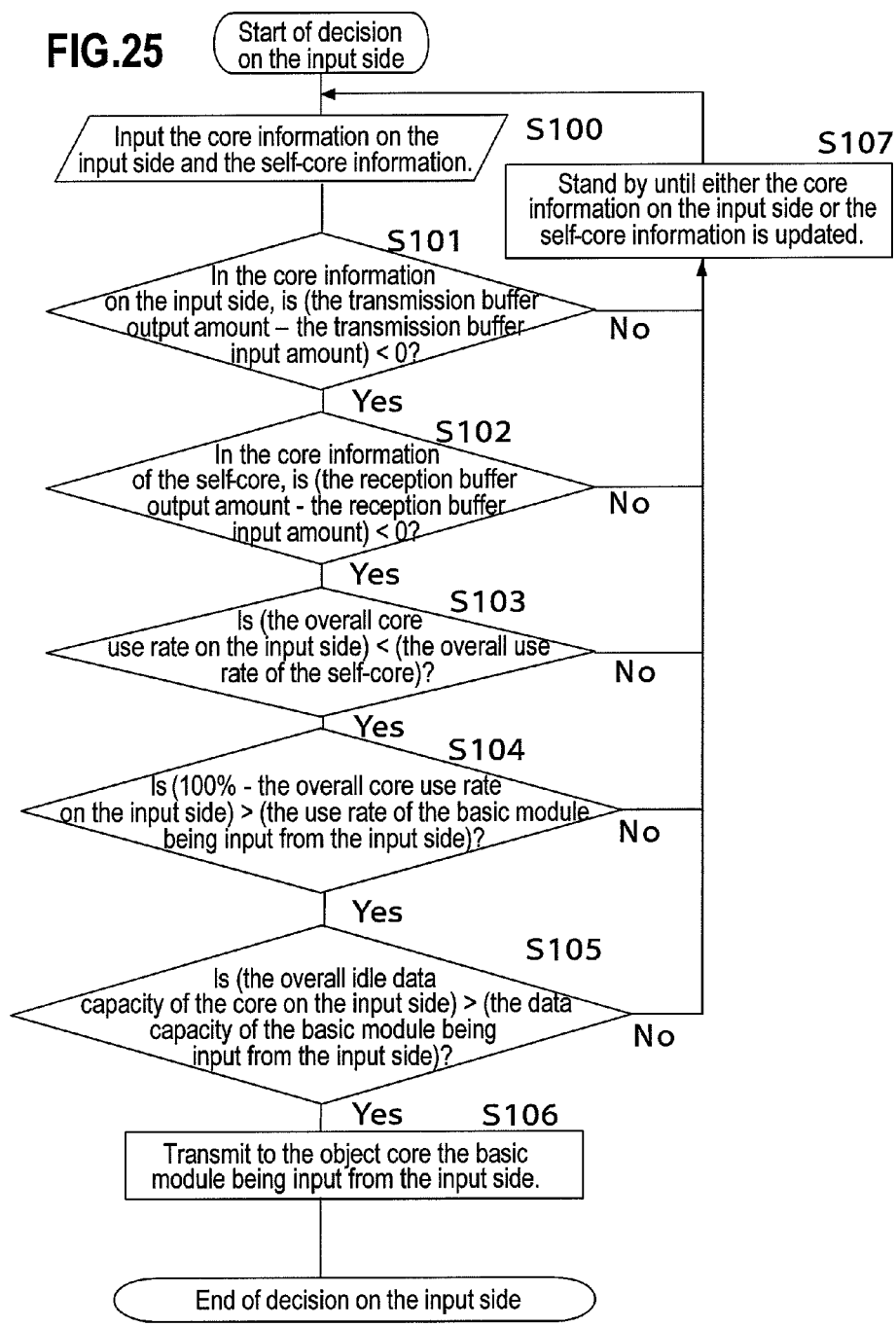

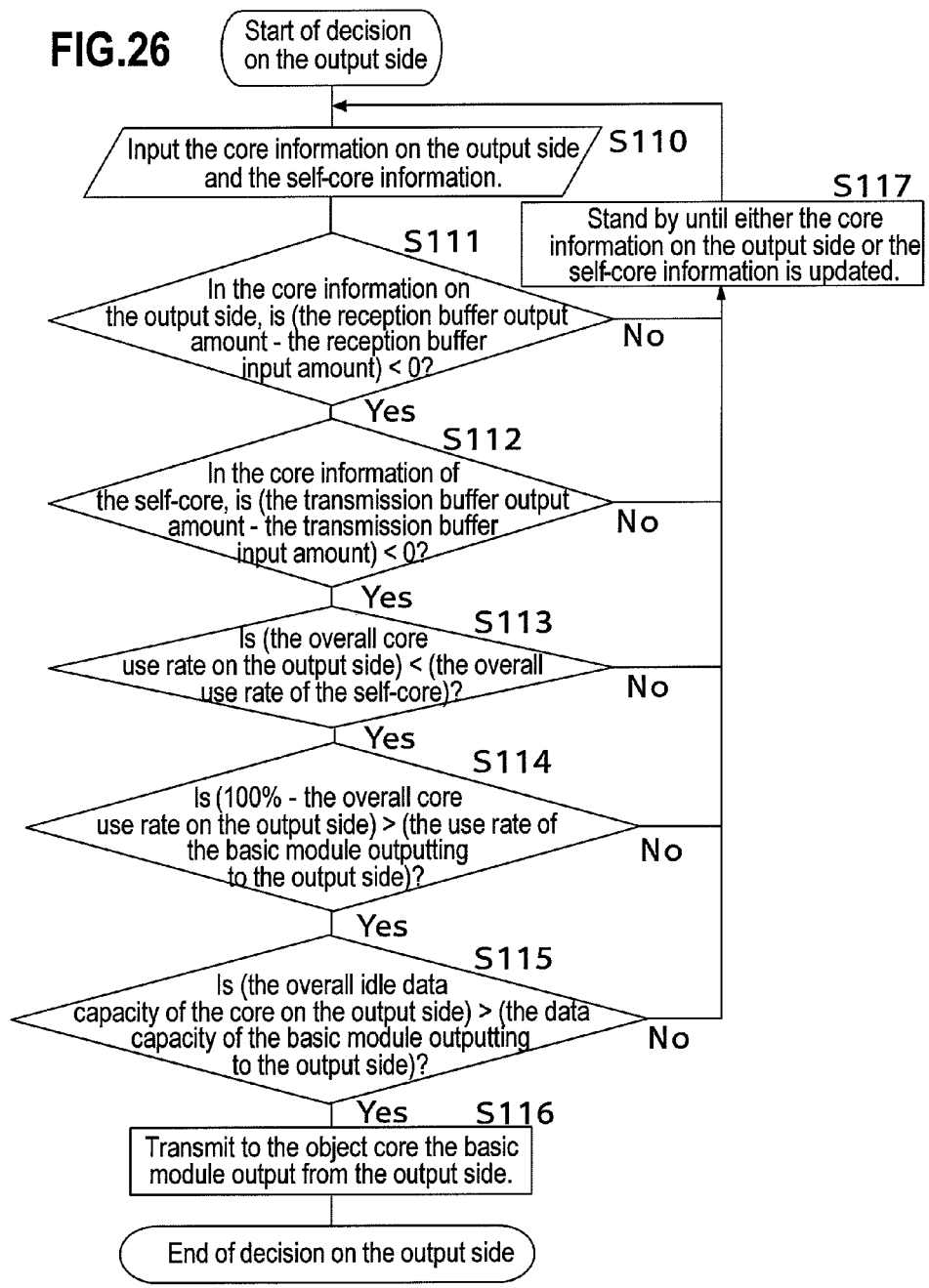

FIG.27

| Destination core No. | : 3 |
|---|---|
| Source core No. | : 2 |
| Basic module name: module 4 | |
| Module size | :400 kbyte |

FIG.28

| Destination core No. | : 3 |
|---|---|
| Source core No. | : 2 |
| Basic module name: module 4 | |
| Possibility/impossibility of handover and response: possible | |

FIG.32

| Object core No. : 2 |
|---|
| Module transmission permission to the input source core side: inhibited |
| Module reception permission from the input source core side: permitted |
| Module transmission permission to the output destination core side : inhibited |
| Module reception permission from the output destination core side: permitted |
| Execution/non-execution of module saving into another core side: no |

FIG.33A

| | |
|---|---|
| Object core | :1 |
| Reception buffer input amount: | 500 kbyte |
| Reception buffer output amount | 400 kbyte |
| Transmission buffer input amount | 500 kbyte |
| Transmission buffer output amount | 400 kbyte |
| Overall core use rate | 40 % |
| Use rate of module 1 | 20 % |
| Use rate of module 2 | 20 % |
| Overall core data size | 1200 kbyte |
| Overall core idle data capacity | 800 kbyte |
| Data size of module 1 | 600 kbyte |
| Data size of module 2 | 600 kbyte |

FIG.33B

| | |
|---|---|
| Object core | : 2 |
| Reception buffer input amount | 500 kbyte |
| Reception buffer output amount | 500 kbyte |
| Transmission buffer input amount | 500 kbyte |
| Transmission buffer output amount | 500 kbyte |
| Overall core use rate | 40 % |
| Use rate of module 3 | 20 % |
| Use rate of module 4 | 20 % |
| Overall core data size | 1200 kbyte |
| Overall core idle data capacity | 800 kbyte |
| Data size of module 3 | 800 kbyte |
| Data size of module 4 | 400 kbyte |

FIG.33C

| | |
|---|---|
| Object core | : 3 |
| Reception buffer input amount | 600 kbyte |
| Reception buffer output amount | 500 kbyte |
| Transmission buffer input amount | 500 kbyte |
| Transmission buffer output amount | 400 kbyte |
| Overall core use rate | 80 % |
| Use rate of module 5 | 30 % |
| Use rate of module 6 | 50 % |
| Overall core data size | 1200 kbyte |
| Overall core idle data capacity | 800 kbyte |
| Data size of module 5 | 600 kbyte |
| Data size of module 6 | 600 kbyte |

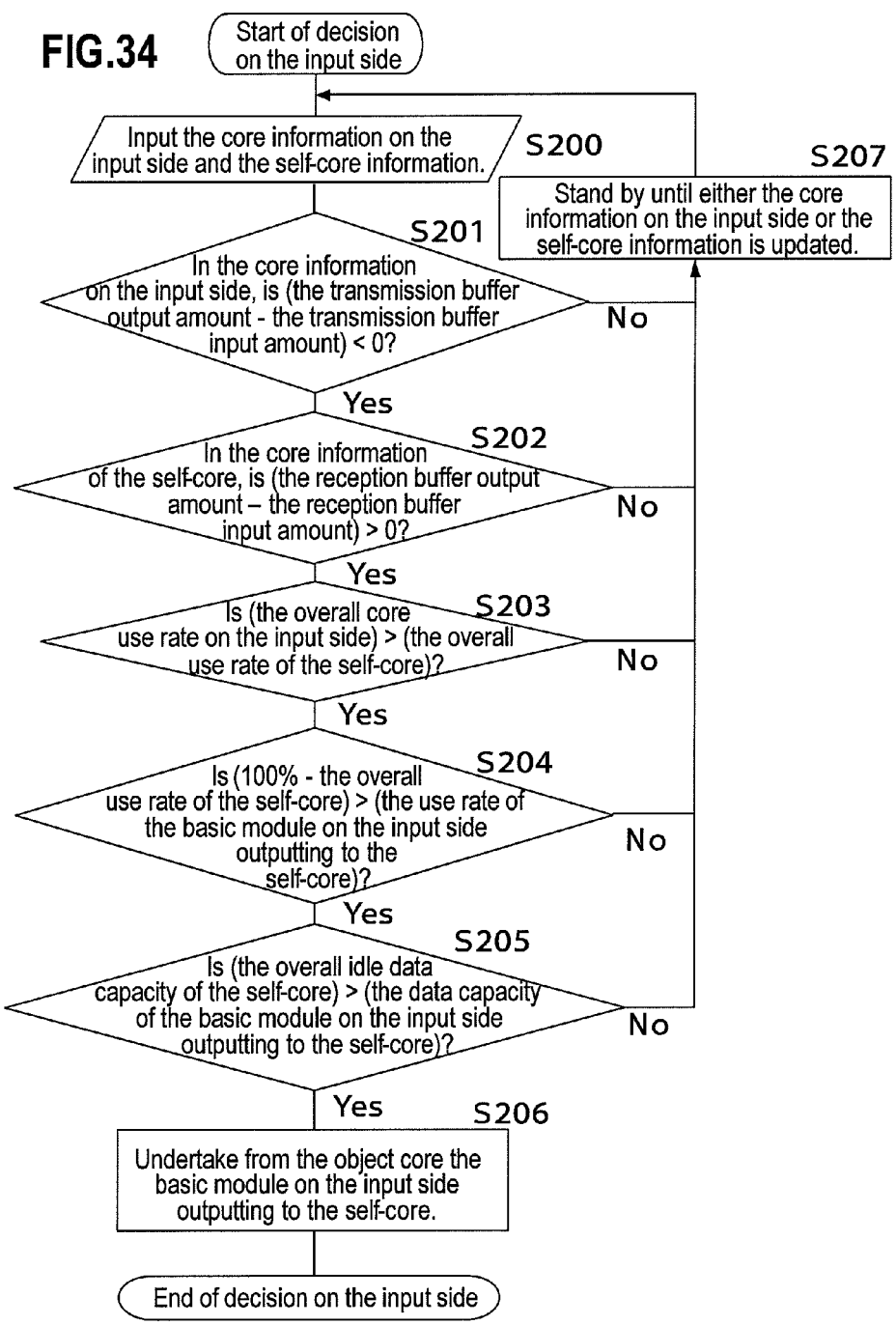

FIG.36

| Destination core No. | : 3 |
| Source core No. | : 2 |
| Basic module name: module 5 | |
| Module size | : 600 kbyte |

FIG.37

| Destination core No. | : 3 |
| Source core No. | : 2 |
| Basic module name: module 5 | |
| Possibility/impossibility of undertaking and response: possible | |

FIG.38

| | |
|---|---|
| Object core No. | : 2 |
| Basic module name: module 5 | |
| Data size | : 600 kbyte |
| Input core No. | : 2 |
| Input source module name: module 4 | |
| Output core No. | : 3 |
| Output destination module name: module 6 | |
| Program data  program data of module 5 (600 kbyte) | |

FIG.39

| | |
|---|---|
| Destination core No. | : 2 |
| Source core No. | : 3 |
| Basic module name: module 5 | |
| Undertaking completion information : completed | |

FIG.41

| Object core No. : 2 |
|---|
| Module transmission permission to the input source core side: permitted |
| Module reception permission from the input source core side: inhibited |
| Module transmission permission to the output destination core side : permitted |
| Module reception permission from the output destination core side: inhibited |
| Execution/non-execution of module saving into another core side: yes |

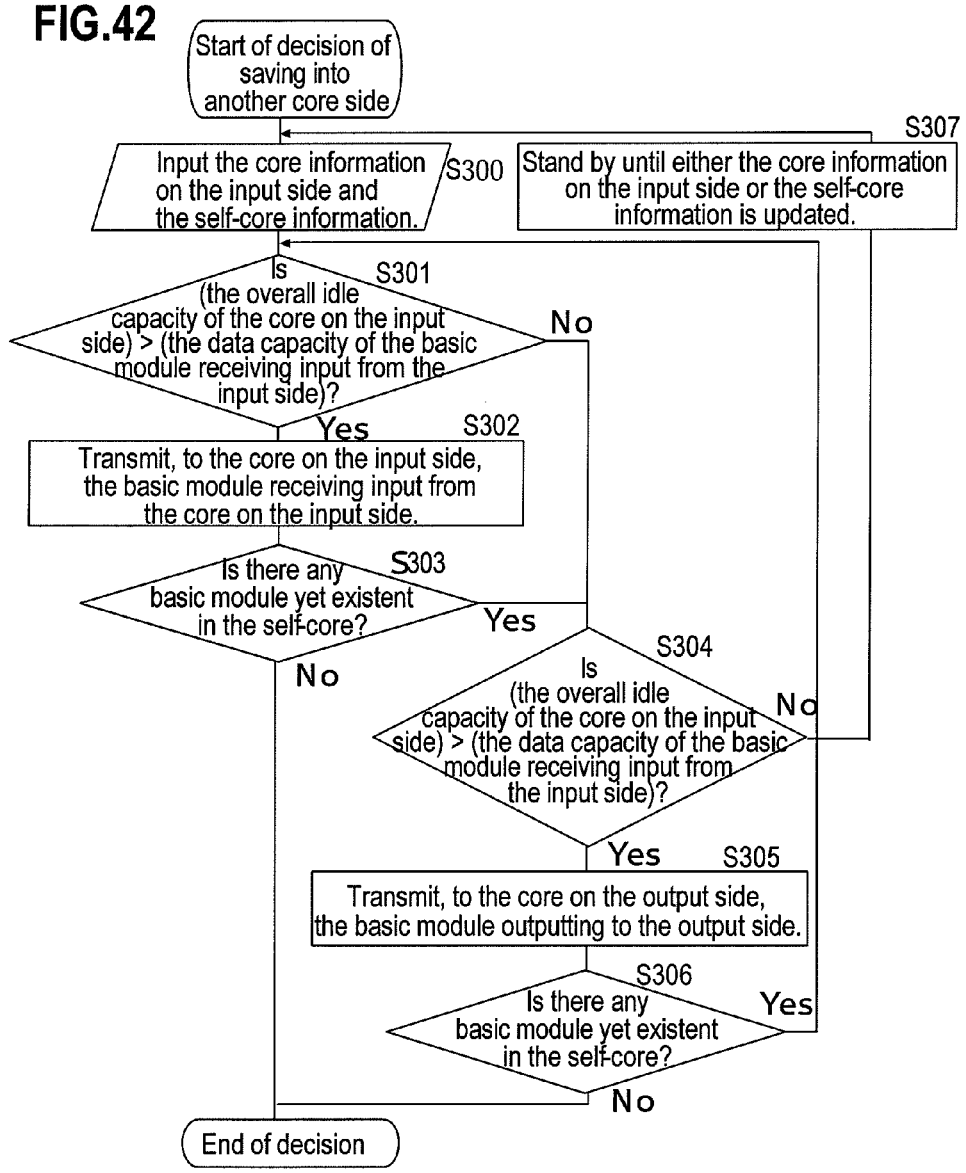

FIG.43A

| | |
|---|---|
| Destination core No. | : 1 |
| Source core No. | : 2 |
| Basic module name: module 3 | |
| Module size | : 600 kbyte |

FIG.43B

| | |
|---|---|
| Destination core No. | : 3 |
| Source core No. | : 2 |
| Basic module name: module 4 | |
| Module size | : 400 kbyte |

FIG.44A

| Destination core No. | : 2 |

Source core No.  : 1

Basic module name: module 3

Possibility/impossibility of handover and response: possible

FIG.44B

Destination core No.  : 2

Source core No.  : 3

Basic module name: module 4

Possibility/impossibility of handover and response: possible

FIG. 45A

| | |
|---|---|
| Object core No. | : 1 |
| Basic module name: module 3 | |
| Data size | : 600 kbyte |
| Input core No. | : 1 |
| Input source module name: module 2 | |
| Output core No. | : 3 |
| Output destination module name: module 4 | |
| Program data : program data of module 3 (600 kbyte) | |

FIG. 45B

| | |
|---|---|
| Object core No. | : 3 |
| Basic module name | : module 4 |
| Data size | : 400 kbyte |
| Input core No. | : 1 |
| Input source module name: module 3 | |
| Output core No. | : 3 |
| Output destination module name: module 5 | |
| Program data : program data of module 4 (400 kbyte) | |

FIG.46A

| Destination core No. | : 2 |
| Source core No. | : 1 |
| Basic module name: module 3 | |
| Handover completion information : completed | |

FIG.46B

| Destination core No. | : 2 |
| Source core No. | : 3 |
| Basic module name: module 4 | |
| Handover completion information : completed | |

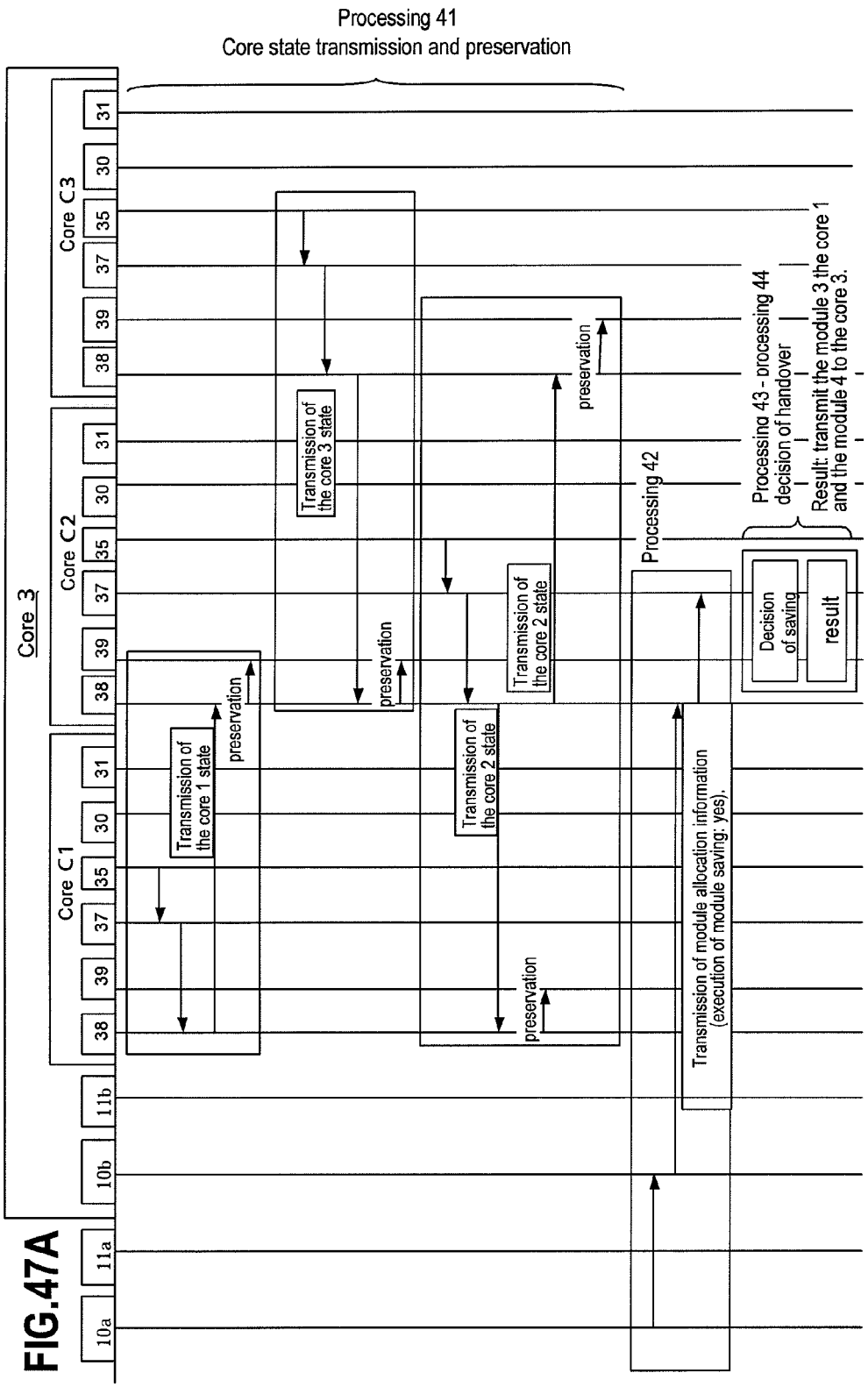

MULTI-CORE PROCESSOR

CROSS REFERENCE TO RELATED APPLICATIONS

This application is a continuation of International Application No. PCT/JP2005/17958, filed on Sep. 29, 2005, now pending, herein incorporated by reference.

TECHNICAL FIELD

The present invention relates to a multi-core processor, and more particularly a multi-core processor ENABLING dynamic application of distribution of processing to each core.

BACKGROUND ARTS

As one type of a processor, a multi-core processor having a plurality of cores integrated on one chip and performing distributed processing of a predetermined function is disclosed in for example, the Japanese Unexamined laid open Patent Publication No. 2002-1170.

To cope with complicated and large-sized software in future, the multi-core processor is promising in view of distribution of processing and parallel processing.

As a remarkable example, recently, technical proposals and products in regard to the multi-core processor have been published and released from a variety of manufacturers. However, to make the multi-core processor into practical use, there are problems as described below.

First, a method for allocating processing contents to each core becomes complicated.

Second, extra power is consumed in case of a state that optimal processing cannot be allocated to each core.

To solve the above-mentioned problems, the following techniques are considered necessary.

Namely, first, a function of appropriately controlling processing contents of each core to fit into a present processing state, and second, a function of automatically determining the processing contents to be allocated to each core are necessary.

DISCLOSURE OF THE INVENTION

Problems to be Solved by the Invention

Accordingly, it is an object of the present invention to automate a processing allocation method for a multi-core processor under the environment of a dynamically changed processing amount. For the above purpose, it is an object of the present invention to provide a multi-core processor capable of establishing an algorithm necessary for deciding processing allocation to each core, and an efficient processing allocation algorithm simple for software engineers.

Means to Solve the Problems

As a first aspect of the present invention to achieve the aforementioned objects, there is provided a processing load distribution method in a multi-core processor having a plurality of cores, including forming a plurality of basic modules having processing contents required for the overall processor divided into minimum configuration units each including a unified input/output format interface; as initial allocation, allocating in distribution the plurality of basic modules to the plurality of cores; and subsequently, based on functional information of each core, relocating the plurality of initially allocated basic modules either periodically or at appropriate timing.

As a second aspect of the present invention to achieve the aforementioned objects, a multi-core processor having a plurality of cores includes: a core section having the plurality of cores, and a processor section. The above processor section further includes: a reception section transferring a processing object data received from the outside to each core in the core section; a transmission section transmitting a data, output to the outside, from the core section to the outside; a basic module transmission section deciding to which of the plurality of cores the basic module transmitted from the outside is to be allocated, and performing relocation processing of the basic module to the object core; and a basic module allocation control section informing the entire plurality of cores about a relocation control method specified from the outside. Further, as initial allocation, the plurality of basic modules are allocated in distribution to the plurality of cores, and further, based on the functional information of each core, the plurality of initially-allocated basic modules are relocated either periodically or at appropriate timing.

In the above first and second aspects, the functional information of each core is information obtained from at least one of the functions of: i) counting the number of signals requested to the self-core and the number of signals being output from the self-core to other cores; ii) measuring a reception buffer storage capacity and a transmission buffer storage capacity incorporated in the self-core; and iii) measuring the number of queues requested to the self-core And the number of queues requested to other cores.

Further, it may be possible to relocate the plurality of basic modules in a manner such that a processing capacity of each core comes to have a maximum value for each of the plurality of basic modules, using the entire plurality of cores.

Also, it may be possible to relocate the plurality of basic modules by means that, among the plurality of cores, a core having a high use priority undertakes a basic module in a core having a low use priority.

Further, it may be possible to relocate the plurality of basic modules to other cores, leaving at least one core among the plurality of cores, in a manner such that a processing capacity of each core comes to have a maximum value for each of the plurality of basic modules In the above-mentioned second aspect, each of the plurality of cores in the core section includes: a data input/output section; a buffer measurement section measuring an input buffer amount and an output buffer amount in the data input/output section; a program execution area having the basic modules allocated therein; and a core use rate measurement section measuring a use rate of the overall program execution area and a use rate per basic module, and further, the above each of the plurality of cores includes: a core state transmission section outputting a core state based on the input buffer amount and the output buffer amount, measured by the buffer measurement section, and the program execution area use rate, measured by the core use rate measurement section; an information database describing state information of other cores obtained through a communication section; and a module allocation control section comparing the self-core state, transmitted from the core state transmission section, with a state of another core described in the information database, taking charge of execution of processes before and after the basic module allocated in the self-core, and performing relocation control of the basic modules when a difference exists between the overall core use rates.

Further features of the present invention will become more apparent by the embodiments described below with the reference of the drawings.

BRIEF DESCRIPTION OF THE DRAWINGS

FIG. 23 shows a diagram illustrating module allocation information obtained at the time of processor initiation.

FIG. 24A shows a diagram illustrating core information of the core C1.

FIG. 24B shows a diagram illustrating core information of the core C2.

FIG. 24C shows a diagram illustrating core information of the core C3.

FIG. 25 shows a diagram illustrating an input decision algorithm.

FIG. 26 shows a diagram illustrating an output decision algorithm.

FIG. 27 shows a diagram illustrating a basic module handover request message.

FIG. 28 shows a diagram illustrating a basic module handover response message.

FIG. 32 shows a diagram illustrating module allocation information obtained at the time of initiation of processor 1.

FIG. 33A shows a diagram illustrating core information of the core C1.

FIG. 33B shows a diagram illustrating core information of the core C2.

FIG. 33C shows a diagram illustrating core information of the core C3.

FIG. 34 shows a diagram illustrating an input side decision algorithm.

FIG. 36 shows a diagram illustrating a basic module undertaking request message.

FIG. 37 shows a diagram illustrating a basic module undertaking response message.

FIG. 38 shows a diagram illustrating basic module input/output data.

FIG. 39 shows a diagram illustrating a basic module undertaking completion message.

FIG. 41 shows a diagram illustrating module allocation information.

FIG. 42 shows a diagram illustrating a saving decision algorithm.

FIG. 43A shows a diagram illustrating a basic module handover request message (part 1).

FIG. 43B shows a diagram illustrating a basic module handover request message (part 2).

FIG. 44A shows a diagram illustrating a basic module handover response message for transmission from the core C1.

FIG. 44B shows a diagram illustrating a basic module handover response message for transmission from the core C3.

FIG. 45A shows basic module input/output data to be transmitted to the core C1.

FIG. 45B shows basic module input/output data to be transmitted to the core C3.

FIG. 46A shows a diagram illustrating a basic module handover completion message from the core C1 to the core C2.

FIG. 46B shows a diagram illustrating a basic module handover completion message from the core C3 to the core C2.

FIG. 47A shows a sequence flow (part 1) corresponding to the processing of pattern 3.

DETAILED DESCRIPTION OF THE PREFERRED EMBODIMENTS

Prior to the description of the embodiments of the present invention with the reference to the drawings, the principle and a conceptual configuration example of the present invention will be described first, for the sake of easy understanding of the present invention.

Figure 1:
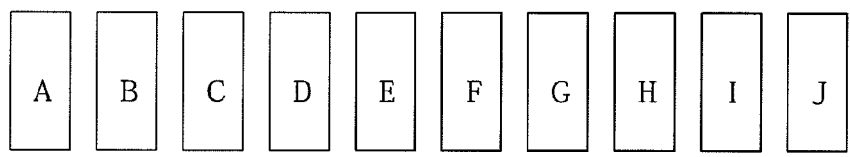
FIG. 1 shows a diagram illustrating a basic module.

FIG. 1 shows a diagram illustrating a basic module. Namely, overall processing contents required in the overall processor are divided into minimum configuration units, each having a unified input/output format interface (IF), so that basic modules are generated.

In the figure, the entire processing contents are divided into basic modules A-J.

Here, in each core of a multi-core processor, there are mounted one or more functions by which knowledge such as information of a self-core use rate, as shown below, is obtainable.

i) A function of counting the number of signals (signals/ms, or the like) requested to the self-core and the number of signals output from the self-core to other cores.

ii) A function of measuring a reception buffer storage capacity and a transmission buffer storage capacity incorporated in the self-core.

iii) A function of measuring the number of queues requested to the self-core and the number of queues requested to other cores.

Figure 2:
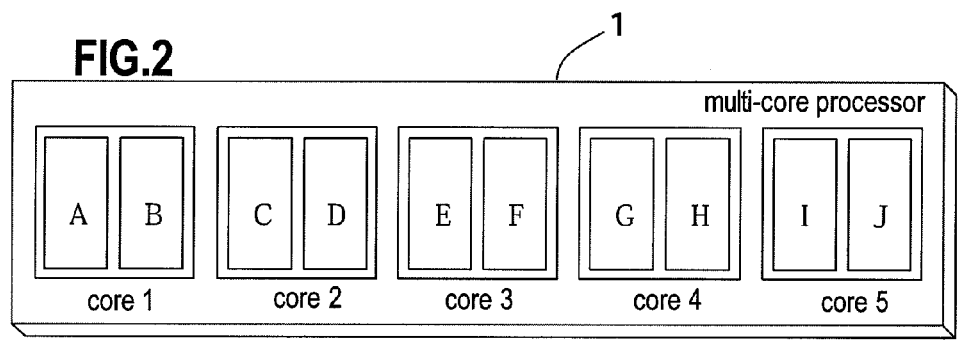
FIG. 2 shows a diagram illustrating initial allocation of a plurality of basic modules of minimum unit.

Next, as shown in FIG. 2, a plurality of basic modules constituted of minimum units divided as shown in FIG. 1 are allocated to a multi-core processor 1 in advance (initial allocation). In the example shown in FIG. 2, two basic modules are allocated to each of five cores.

In the above initial allocation, the basic modules are allocated to each core, and at that time, it is not necessary to take into account a CPU resource amount required for each basic module, the number of processable basic modules per core, and the like.

Next, processing is executed in the state of the initial allocation of the basic modules. At that time, each core performs relocation of the basic modules either periodically or at appropriate timing, depending on the necessity, based on the functional information of i)-iii) described above.

The method of relocation at that time is controlled in conformity with the law shown below.

[Average/Distribution Type]

Figure 3:
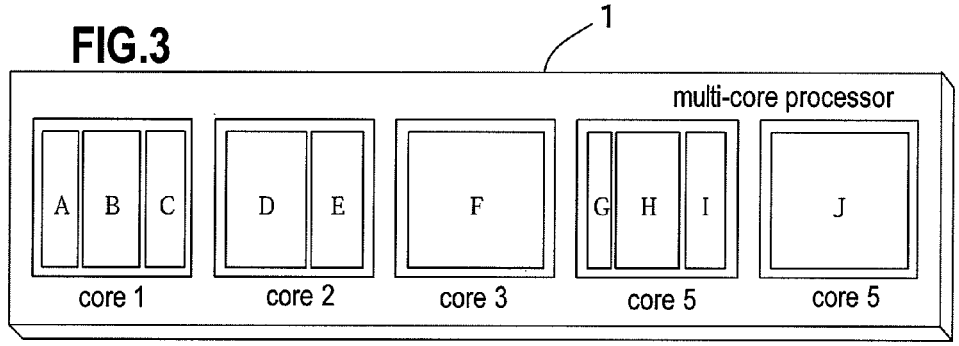
FIG. 3 shows a diagram illustrating an example of relocation by an average/distribution type.

FIG. 3 shows a diagram illustrating an example of relocation according to an average/distribution type.

Using the entire cores C1-5 in multi-core processor 1, the relocation is performed in such a manner that the processing performance of each basic module takes a maximum value. With this, the processing capacity in each core can be extracted to the maximum extent, and a maximum processing efficiency is automatically obtained in the processor as a whole.

According to the above average/distribution method, the processing capacity of each core becomes uniform, and the entire cores can be used effectively. Also, after the relocation, it is possible to continue processing without need of re-relocation, as long as the processing contents are not changed considerably.

[Core Packing Type]

Figure 4:
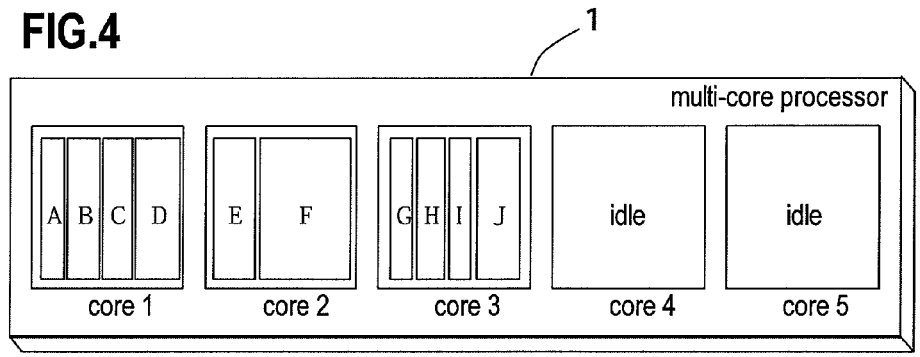
FIG. 4 shows a diagram illustrating an example of relocation by a core packing type.

FIG. 4 shows a diagram illustrating an example of relocation by a core packing type.

According to the above relocation control method, when a core of a higher use priority can undertake a basic module(s) in a core of a lower use priority, the basic module is undertaken and relocated.

When there is a margin in the overall processing of processor 1, the processing is packed into the core having the higher use priority, and thus, it is possible to reduce the number of cores for use. This enables limiting the number of cores per processor to the minimum extent, which is suitable when it is intended to generate an unused core, and the unused core becomes available to other tasks, etc.

Further, in case of a processor in which the consumption power is determined by the number of cores in use, it is possible to suppress the power consumption of the processor.

[Application of the Average/Distribution Type and the Core Packing Type]

By applying the above-mentioned average/distribution control and the core packing control, the following usage is possible.

Figure 5:
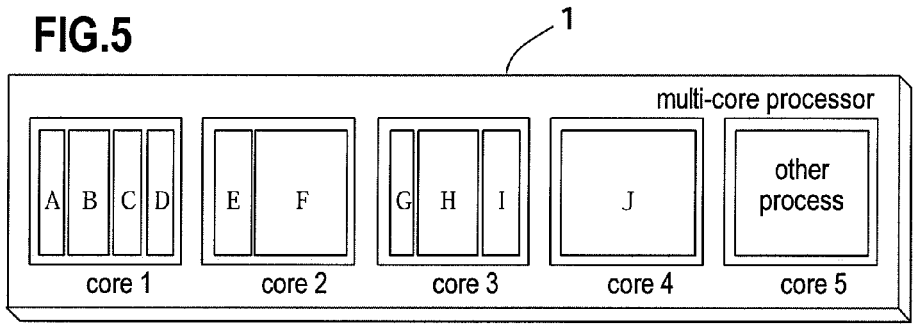
FIG. 5 shows a diagram illustrating a first exemplary application of an average/distribution type and a core packing type.

FIG. 5 shows a diagram illustrating a first exemplary application of the average/distribution type and the core packing type.

Among the total number of cores of processor 1, basic modules are averaged/distributed in a state that a number A of cores are left. Other processing is executable in the cores left (i.e. a core 5 in FIG. 5). The value of A, the number of the cores left, can be specified within the range of:

$0 \leqq A \leqq$ (Total number of cores—the number of minimally necessary cores)

Further, the relocation can be made according to the scale of interruption processing entering periodically.

Figure 6:
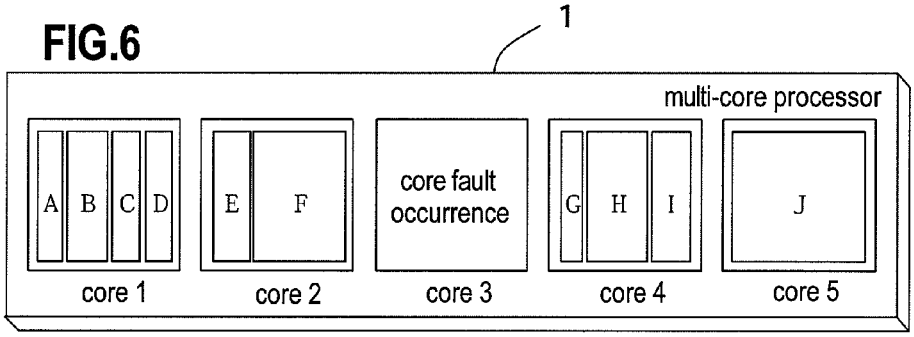
FIG. 6 shows a diagram illustrating a second exemplary application of an average/distribution type and a core packing type.

FIG. 6 shows a diagram illustrating a second exemplary application of the average/distribution type and the core packing type.

Among the plurality of cores existent in processor 1, when a fault occurs in a core (core C3 in the example of FIG. 6), the basic modules are averaged/distributed in the state the above core C3 is excluded.

Since the operation can be continued in the state of leaving the faulty core C3, the device is operable even before a maintenance person intervenes, though the device falls in a state of degraded performance.

As can be understood from the above principle, according to the present invention, it becomes possible to obtain the following merits which have been unavailable by the prior arts.

i) Processing can be allocated to each core without being intended by software development staff.

ii) By only using two algorithms, i.e. the average/distribution type and the core packing type, a variety of kinds of program allocation can be achieved.

iii) Optimization of the basic programs in the overall processor can be achieved without need of an additional program for controlling basic module allocation in the overall processor.

Next, the description on typical embodiments according to the present invention, corresponding to the aforementioned principle and the conceptual configuration, will be given below.

The device of an application target of the present invention is a processor, such as a CPU and a network processor, including two or more arithmetic circuits (cores). Further, as an applicable condition of the present invention, each core includes a functional section capable of inputting a program (basic module) having standardized data input/output.

Figure 7:
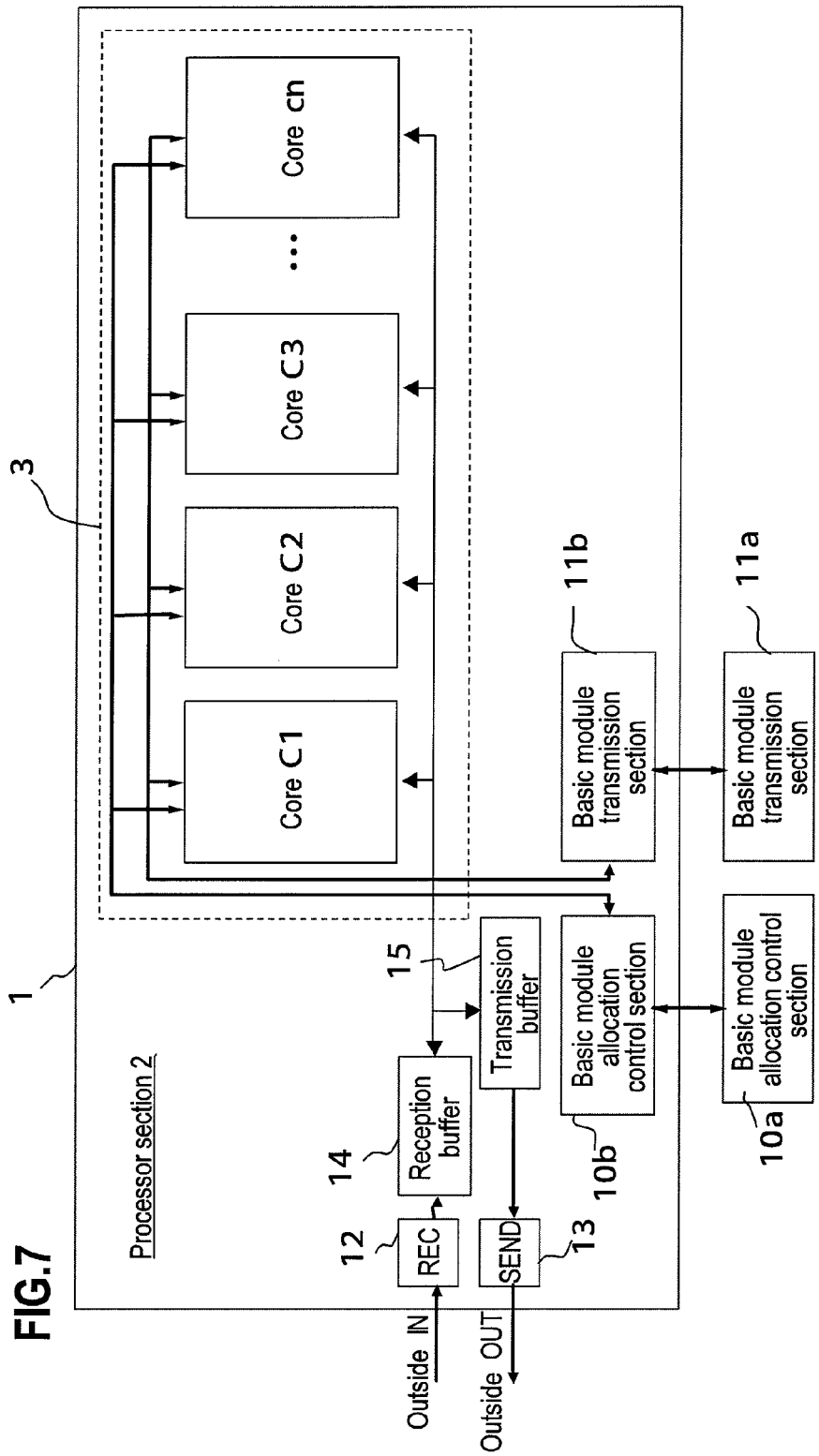
FIG. 7 shows a diagram illustrating an exemplary configuration of processor 1 constituted of one chip to which the present invention is applied.

FIG. 7 shows a diagram illustrating an exemplary configuration of a processor 1 constituted of one chip, to which the present invention is applied.

There are provided a core section 3 having a plurality of cores C1, C2, . . . core Cn, and a processor section 2 excluding core section 3.

Further, processor section 2 includes a functional section capable of inputting a basic module into each core of core section 3.

In the following, the function of each functional section will be described in detail.

[Processor Section 2]

The processor includes core section 3, having two or more cores, and processor section 2, having other functions than core section 3. Processor section 2 has a function of handing over data, which are input from the outside to a reception section 12, to each core C1-Cn. Also, processor section 2 has a function of transmitting data, which are output from each core C1-Cn and destined for outside, to the outside through a transmission section 13.

Further, based on a data transmitted from an external basic module transmission section 11a, processor section 2 decides, in an internal basic module transmission section 11b, which basic module is to be allocated to which core, and allocates a module(s) to an object core.

Additionally, in the following description, basic module transmission section 11a and basic module transmission section 11b are collectively, and simply, referred to as a basic module transmission section 11.

When the relationship between a core and a basic module is not specified from basic module transmission section 11, processor section 2 transmits a basic module to a first core C1 in core section 3, and as soon as receiving from the first core C1 information that a memory capacity for storing basic modules is fully engaged, processor section 2 starts transmitting the basic module to a next core C2.

When a method for controlling the core allocation of basic modules is specified from an external basic module allocation control section 10a, processor section 2 informs the entire cores C1-Cn of the above control information, by means of an internal basic module allocation control section 10b. At that time, processor section 2 only informs the entire cores C1-Cn of the specified control information, and neither grasps each core state nor controls according to the state. Additionally, in the description hereafter, basic module allocation control section 10a and basic module allocation control section 10b are collectively and simply referred to as a basic module allocation control section 10.

When a retransmission request of a basic module is received from a particular core, processor section 2 requests a basic module transmission section 11 to allocate the object basic module to the object core.

[Core Section 3]

Cores C1-Cn in core section 3 are allocated in one processor by the number of two or more, which are portions for executing the basic modules.

Figure 8:
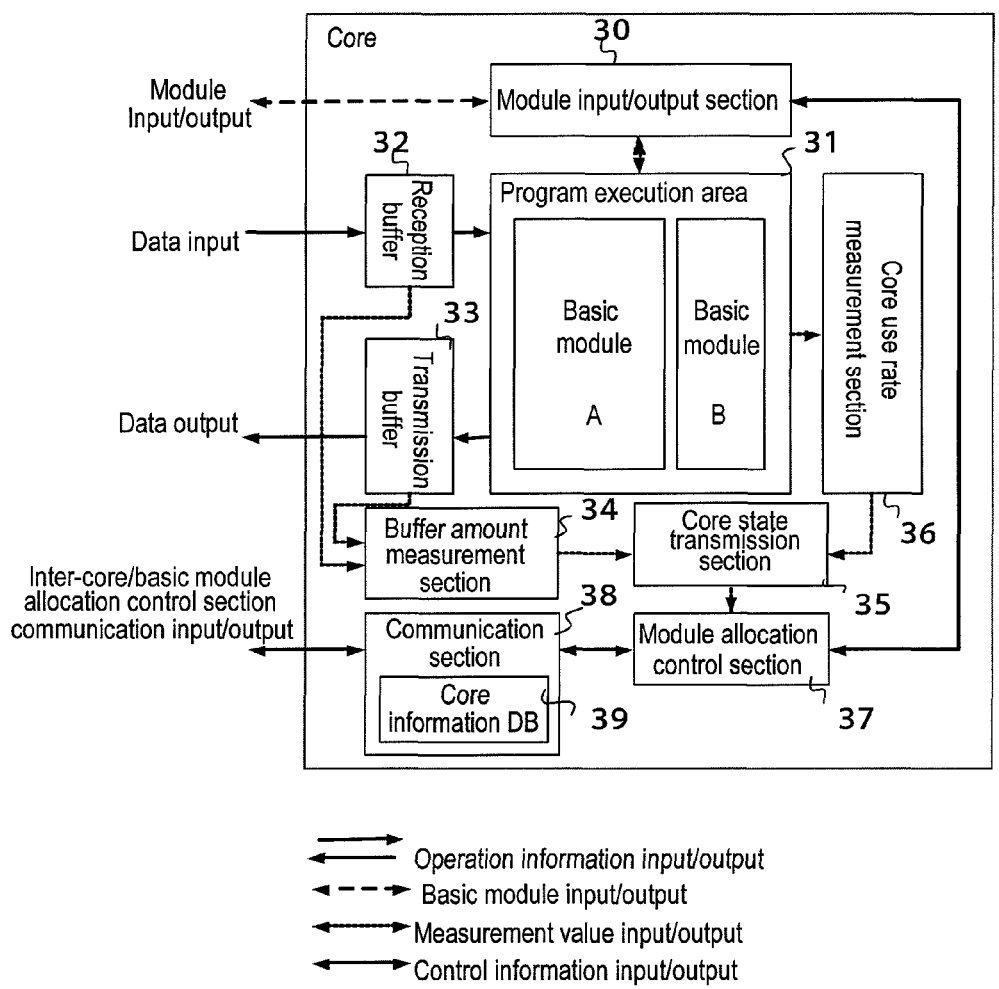
FIG. 8 shows an exemplary configuration block diagram of a single core common to each core C1-Cn in core section 3.

FIG. 8 shows an exemplary block diagram of a core configuration common to each core C1-Cn in a core section 3.

Each core C1-Cn receives, in a module input/output section 30, a basic module allocated by basic module allocation control section 10 of processor section 2, so as to expand into a program execution area 31 in the corresponding core.

In case of a basic module state allocated in program execution area 31 (in FIG. 8, basic modules A, B are allocated), and when a data is input through a reception section 12, and then stored into a reception buffer 32, the received data is taken into program execution area 31, as operand information.

Normally, when a plurality of basic modules are allocated in program execution area 31, the above basic modules form a mutually related processing flow. Therefore, after the input data is processed in the basic module A, the data is operated in the basic module B. In such a manner, a handover is taken place inside program execution area 31.

Thereafter, the data having been processed in program execution area 31 is stored into transmission buffer 33 provided in core section 3, and when arithmetic operation by a basic module located in another cell is necessary, the data is transmitted toward the cell concerned.

Also, as to the data of which signal processing is completed by the above arithmetic operation in the basic module, the above data is transmitted to a transmission buffer 15 in processor section 2.

In the aforementioned cycle of a sequence of data reception→arithmetic operation→data transmission, each core in core section 3 constantly measures the core state such as a data transmission/reception amount and an arithmetic operation amount.

As kinds of measurement data, there are an input buffer amount and an output buffer amount in data reception buffer 32 and an input buffer amount and an output buffer amount in data transmission buffer 33. The input buffer amount and the output buffer amount in data transmission buffers 32 and 33 are monitored constantly (or monitored at certain intervals) by a buffer measurement section 34, and transmitted to a core state transmission section 35.

Using the above-mentioned procedure, it is possible to calculate the speed of the data amount transmitted to core section 3 and the speed of the data amount transmitted from one core to another core (or transmission buffer 15 in processor section 2), and a difference between the data transmission amount and the data reception amount.

Further, in a core use rate measurement section 36, the use rate of the overall program execution area and each use rate per basic module are obtained.

To a module allocation control section 37, the state of the self-core is transmitted constantly (or at certain intervals). Based on the above core state information and the state information of the other cores, which is obtained by a communication section 38 and stated in an information database 39, it is decided whether or not the present operation of the self-core is appropriate.

Specifically, by comparing with core states taking charge of the processes performed before and after the basic module allocated in the self-core, if there is a difference in the overall core use rates, the relocation of the basic modules is executed.

Based on the above-mentioned configuration, the detailed embodiments will be described successively.

[Basic Module Data Format]

A program being allocated in program execution area 31 of each core and having standardized data input/output is referred to as a basic module.

Figure 9:
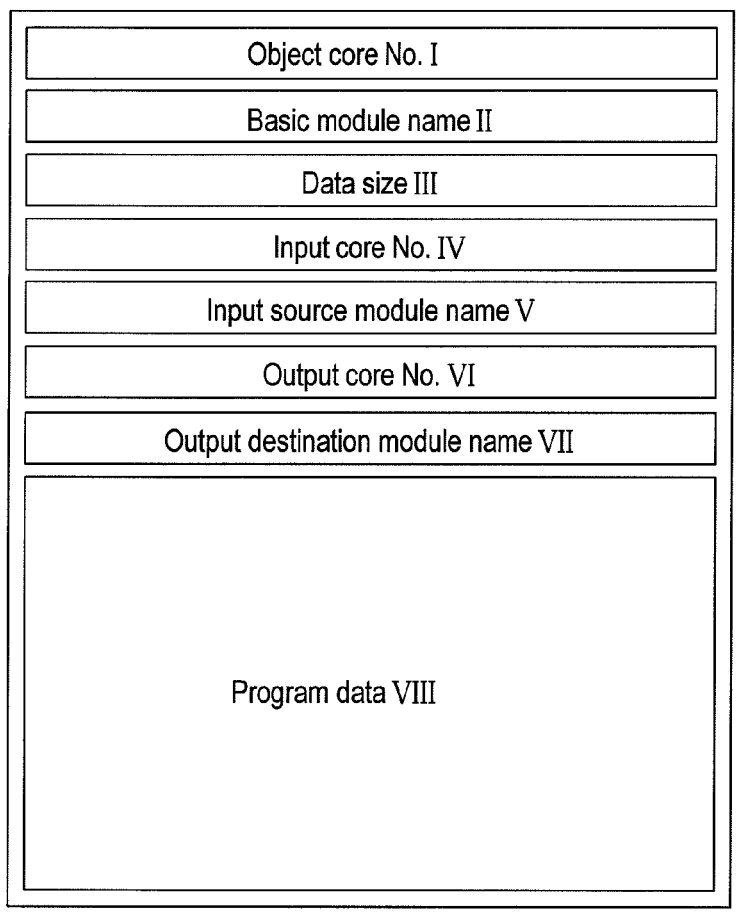
FIG. 9 shows a diagram illustrating one example of a data format in a basic module and an exemplary program format in a basic module.
Figure 10:
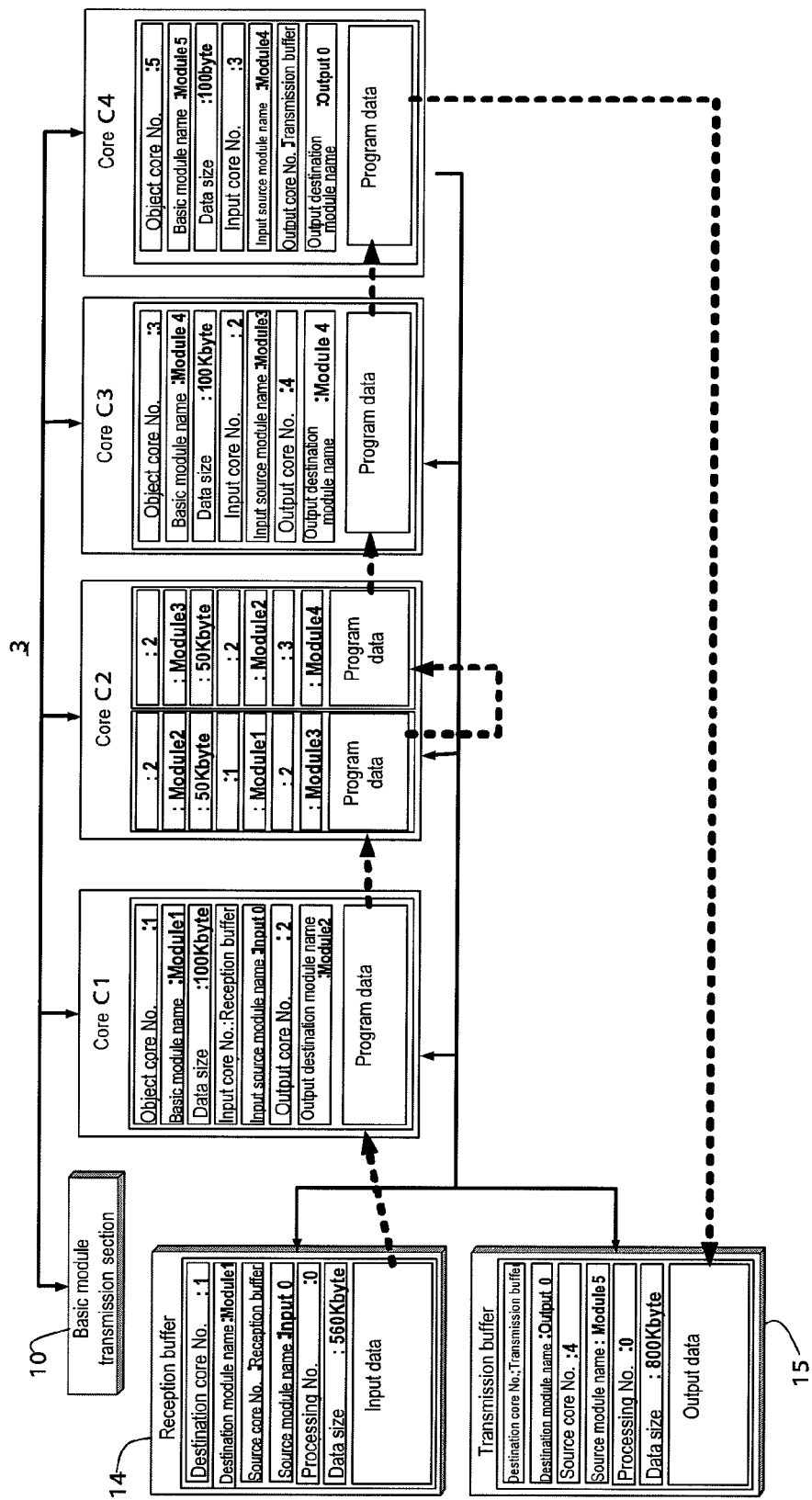
FIG. 10 shows a diagram illustrating one example of relationship among a plurality of basic module data.

In regard to a data format in the above basic module and a program format in the basic module, each example thereof is shown in FIG. 9. Further, FIG. 10 shows a diagram illustrating one example of relationship among a plurality of basic module data. In FIG. 10, the basic module data are successively forwarded to each core of allocation destination, as shown by arrows of broken lines, and allocated.

In FIG. 9, the data format of the basic module includes eight types of data, which are object core No.: I, basic module name II, data size III, input core No.: IV, input source module name V, output core No.: VI, output destination module name VII, and program data VIII.

The object core No.: I indicates a core number in which the basic module is to be processed, and basic module allocation control section 10 in processor section 2 allocates the basic module concerned into the core corresponding to the above core number.

The basic module name II indicates the name of the self-module, and is used to distinguish from other modules.

The data size III indicates the data size of the program data VIII in the basic module, and is used to decide whether the program of interest is allocatable in the program execution area.

The input core No.: IV indicates a core number from which an input data of the program in the basic module is to be transmitted. The program in the basic module expects data input from the core indicated by the above number. Further, when "the reception buffer in the processor" is indicated as the input core No. IV, the object is not that a core, but the data to be input is stored in reception buffer 14 inside processor section 2. Thus, the input data concerned is fetched from reception buffer 14.

The input source module name V indicates the name of a basic module from which the input data of the program in the corresponding basic module is to be transmitted. The program in the basic module expects that a data is input from the basic module having the above name. Further, when "the reception buffer in the processor" is indicated as the input core number, the data in reception buffer 14, in which the input source module name V is indicated, is obtained.

The output core No.: VI indicates a core number of the program in the basic module to which an output data is to be transmitted. The program in the basic module transmits the output data to the core indicated by the above number. Further, when "the transmission buffer in the processor" is indicated as the output core No.: VI, the object is not a core, but the data to be output is transmitted to transmission buffer 15 inside processor section 2.

The output destination module name VII indicates the name of a basic module to which the output data of the program in the basic module is to be transmitted. The program in the basic module transmits the data to the basic module having the above name. When "the transmission buffer in the processor" is indicated in the output core No.: VI, a data having an indication of the output destination module name VII is stored into transmission buffer 15.

In the program data VIII, a program data of which input/output format is specified is stored.

[Basic Module Program Format]

As to a program format in the basic module, it is sufficient if the input data format and the output data format respectively coincide with the output format of the input source module and the input format of the output destination module. Also, as to program content, it is sufficient if the program content is described using a function, etc. usable in the program execution area.

[Input/Output Data Format Between Basic Modules]

Figure 11:
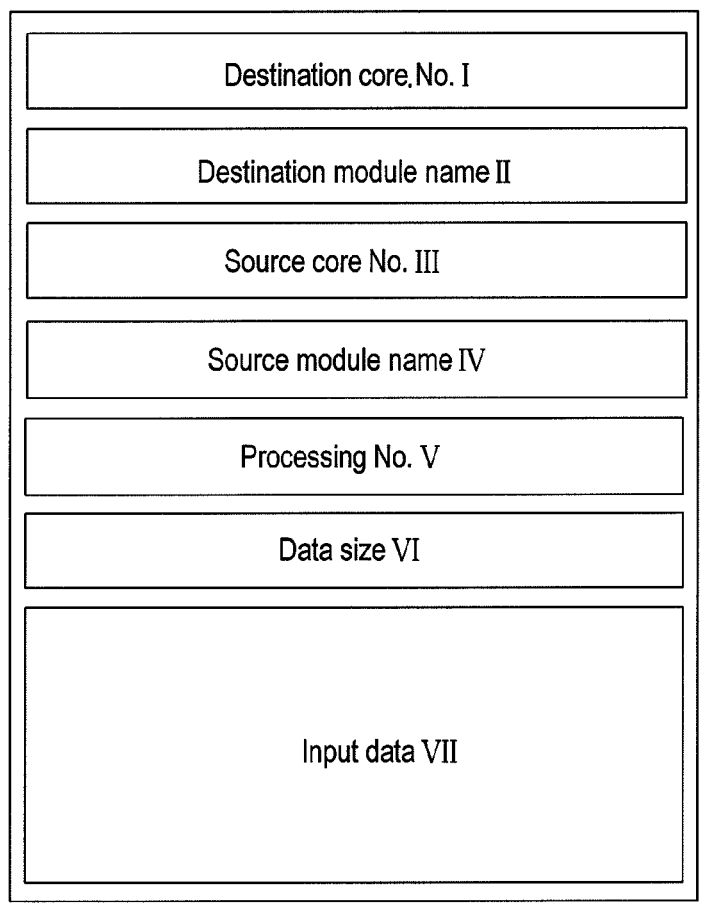
FIG. 11 shows a diagram illustrating one example of input/output data format between basic modules.
Figure 12:
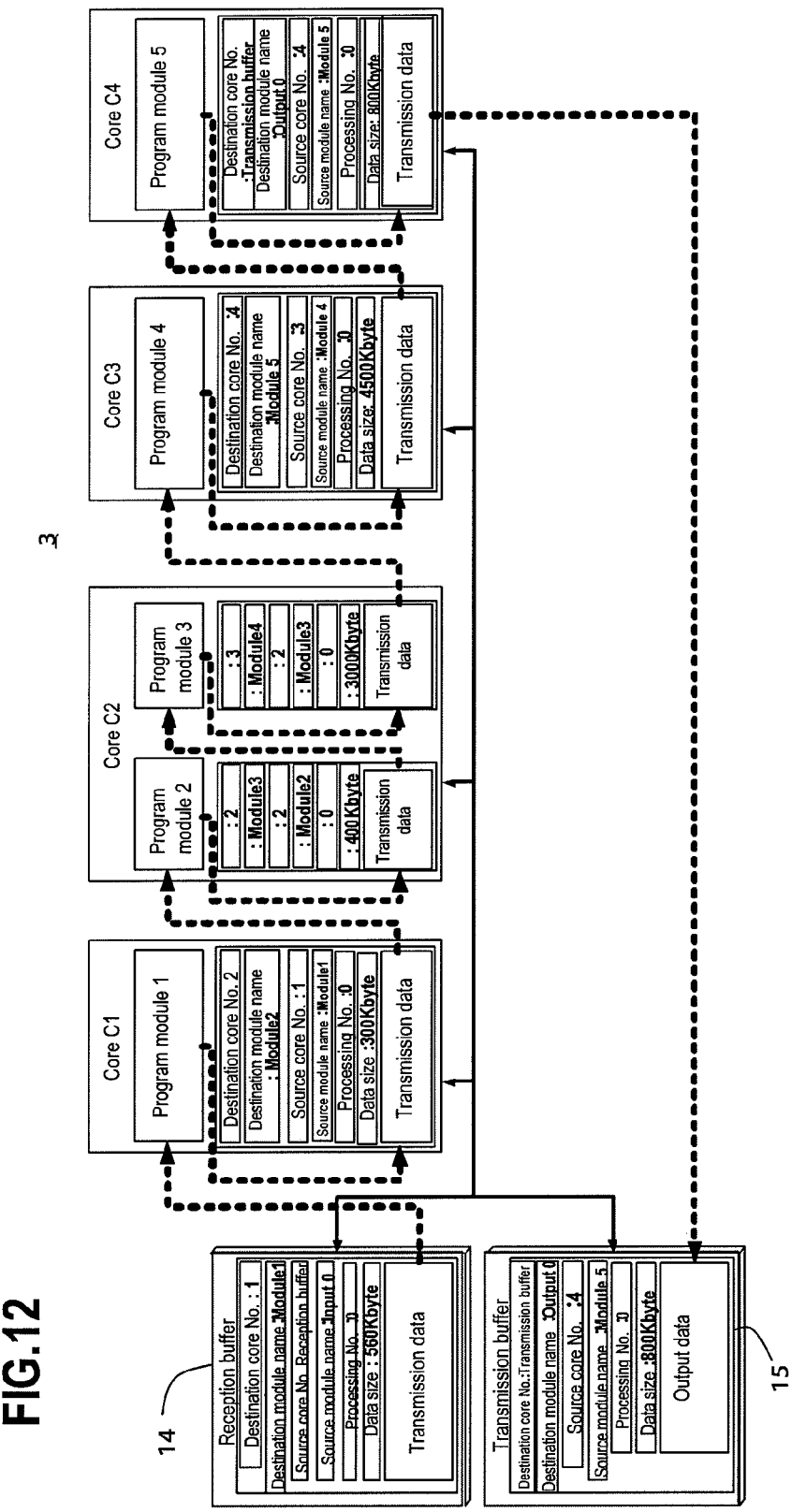
FIG. 12 shows a diagram illustrating the relationship of input/output data among a plurality of modules.

In the following, one example of the input/output data format between basic modules is shown. FIG. 11 is one example of input/output data format between the basic modules, and FIG. 12 shows a diagram illustrating the relationship of input/output data among a plurality of modules. In FIG. 12, the broken lines with the arrows indicate transmission data flow.

As shown in FIG. 11, the input/output data format between the basic modules includes destination core No.: I, destination module name II, source core No.: III, source module name IV, processing No.: V, data size VI, and input data VII.

The destination core No.: I describes the core number of a data transmission destination.

The destination module name II describes the name of the basic module of the data transmission destination.

The source core No.: III describes the self-core number. In case of reception buffer 32 or transmission buffer 33 in processor 1, the reception buffer or the transmission buffer is described correspondingly.

The source module name IV describes the basic module name of its own. In case of reception buffer 32 or transmission buffer 33 in processor 1, the input data name or the transmission data name, respectively.

The processing No.: V describes the processing number of the data concerned, so as to eliminate confusion with the input/output data related thereto.

The data size VI describes the size of the input/output data.

As to the input data VII, it is sufficient if the input data format and the output data format respectively coincide with the output format of the input source module and the input format of the output destination module.

[Data Format of Core Information]

Hereafter, one exemplary embodiment in regard to the data format of core information will be described. The core information signifies data indicating a core state, such as a core use rate which core state transmission section 35 in core section 3 reports to module allocation control section 37, and a use amount of transmission/reception buffers 32, 33 or the number of transmission/reception signals. Namely, the core information is information for performing cooperative processing among the cores before and after.

Through a communication section 39, module allocation control section 37 reports the above information to a core, which is an object of data handover/undertaking, and reports the self-core state thereto. Also, by comparing the core information obtained from other cores with the self-core information, basic module relocation is triggered.

Figure 13:
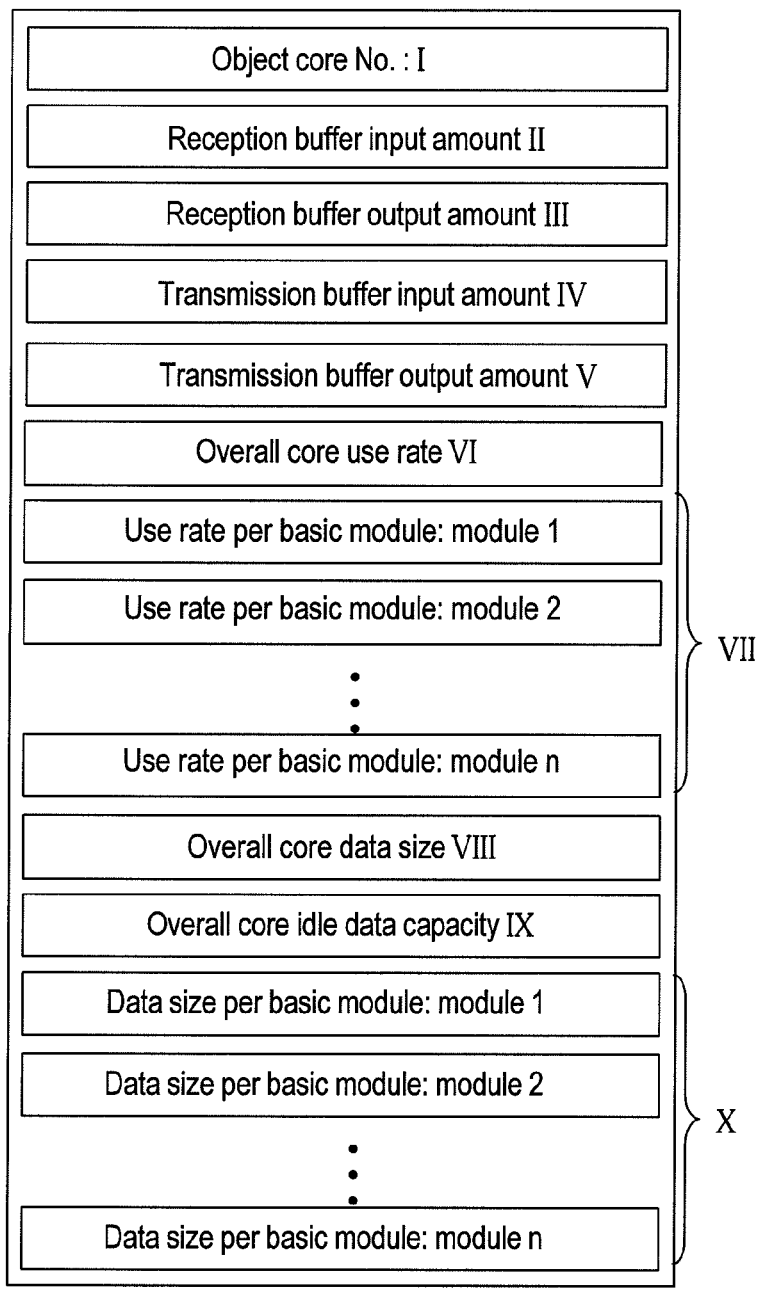
FIG. 13 shows a diagram illustrating a core information data format.

In the following, a typical data configuration of core information will be described, referring to FIG. 13 illustrating a core information data format.

The core information shown in FIG. 13 includes object core No.: I, reception buffer input amount II, reception buffer output amount III, transmission buffer input amount IV, transmission buffer output amount V, overall core use rate VI, use rate per basic module VII, overall core data size VIII, overall core idle data capacity IX, and data size per basic module X.

The object core No.: I indicates the object core number on which the core information is described.

The reception buffer input amount II indicates a data amount input from the outside by reception buffer section 32 during a certain time (t). Using the above value, it is possible to measure a data inflow amount from the outside and an inflow speed, on the basis of the certain time unit (t).

The reception buffer output amount III indicates a data amount input into program execution area 31 by reception buffer section 32 during a certain time (t). Using the above value, it is possible to measure a data input amount to program execution area 31 and an input speed, on the basis of the certain time unit (t).

The transmission buffer input amount IV indicates a data amount output from program execution area 31 by transmission buffer section 33 during a certain time (t). Using the above value, it is possible to measure a data output amount from program execution area 31 and an output speed, on the basis of the certain time unit (t).

The transmission buffer output amount V indicates a data amount output to the outside by transmission buffer section 33 during a certain time (t). Using the above value, it is possible to measure a data output amount to the outside and an output speed, on the basis of the certain time unit (t).

The overall core use rate VI indicates a total value of the use rate of all processes in program execution area 31. The above value corresponds to a CPU use rate in case of a single CPU.

The use rate VII per basic module separately indicates the use rate of each basic module allocated in program execution area 31.

The overall core data size VIII indicates a total value of the data size of the basic module(s) presently allocated in program execution area 31.

The overall core idle data capacity IX indicates an idle data capacity which is obtained by subtracting the data size of the basic module(s) being presently allocated, from the overall data areas allocatable in program execution area 31.

The data size X per basic module separately indicates each data size of the basic modules presently allocated in program execution area 31.

[Data Format of Module Allocation Information]

Figure 14:
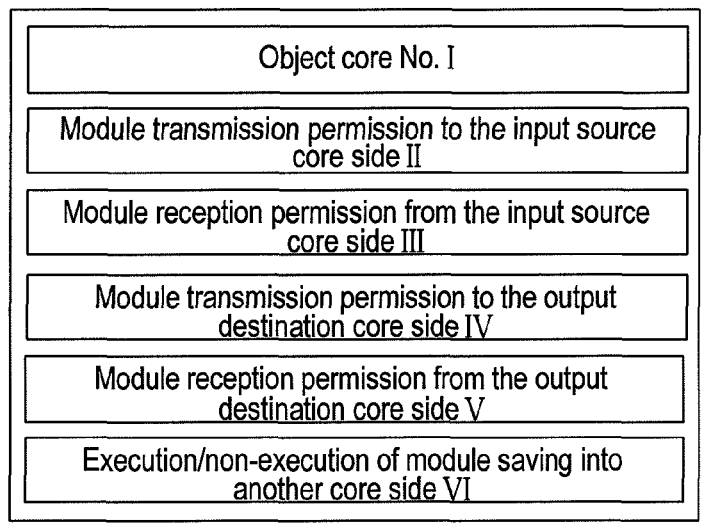
FIG. 14 shows a diagram illustrating one example of an embodiment in regard to a module allocation information data format.

In regard to the data format of module allocation information, the description will be given in the following, using one example of an embodiment shown in FIG. 14.

The module allocation information is a data describing a module relocation algorithm which is transmitted to each core by module allocation control section 10b of the processor, either at certain intervals or depending on the necessity, via an external module allocation control section 10a.

Based on the above information, each core decides whether there is permission to transmit the basic module in the core to another core, or permission to undertake a basic module in another core.

The description will be given using the data structure of the module allocation information shown in FIG. 14.

The module allocation information includes object core No.: I, module transmission permission II to the input source core side, module reception permission III from the input source core side, module transmission permission IV to the output destination core side, module reception permission V from the output destination core side, and execution/non-execution VI of module saving into another core side.

The object core No.: I indicates an object core number of the module allocation information.

The module transmission permission II to the input source core side indicates permission information whether a module may be transmitted to a core on the data input side. When being described as permission, it is possible to transmit the module to the core on the input side, whereas when being not described, the transmission is inhibited. Further, when the input side is reception buffer 14 of processor section 2, the above permission information is discarded because the module transmission is not possible.

The module reception permission III from the input source core side indicates permission information whether reception of a module is permitted when the module is transmitted from a core on the data input side. When being described as permission, it is possible to receive the module from the core on the input side, whereas when being not described, the reception is inhibited.

The module transmission permission IV to the output destination core side indicates permission information whether a module may be transmitted to a core on the data output side. When being described as permission, it is possible to transmit the module to the core on the output side, whereas when being not described, the transmission is inhibited. Further, when the output side is transmission buffer 15 of processor section 2, the above permission information is discarded because the module transmission is not possible.

The module reception permission V from the output destination core side indicates permission information whether reception of a module is permitted when the module is transmitted from a core on the data output side. When being described as permission, it is possible to receive the module from the core on the output side, whereas when being not described, the reception is inhibited.

The execution/non-execution VI of module saving into another core side is described as "Yes" when it is desired to save a basic module which is working in the object core into another core. In case that the saving is to be executed, a basic module is allocated to another core, by deciding the contents of the above-mentioned module transmission permission to the input source core side and the module transmission permission to the output destination core side also.

Therefore, in case that the saving to another core side is to be executed, it is required to obtain permission of either module transmission to the input source core side or module transmission to the output destination core side.

[Format of Basic Module Handover Request/Response Message]

An example of the embodiment in regard to the format of a basic module handover request/response message is shown below.

When a variety of kinds of permission information of module allocation information are received, if the permission of module relocation is indicated, it is possible to relocate the basic module based on a core information data. Assuming a case that more margin is recognized in the processing capacity of another core than in the processing capacity of the self-core from the core information data, processing of handing over (relocating) a portion of the basic module in the self-core to another core is performed, so as to balance a processing amount.

In the following, the formats of a handover request message at that time, a response message from the core undertaking the request, and an actual allocation completion message are shown.

Figure 15:
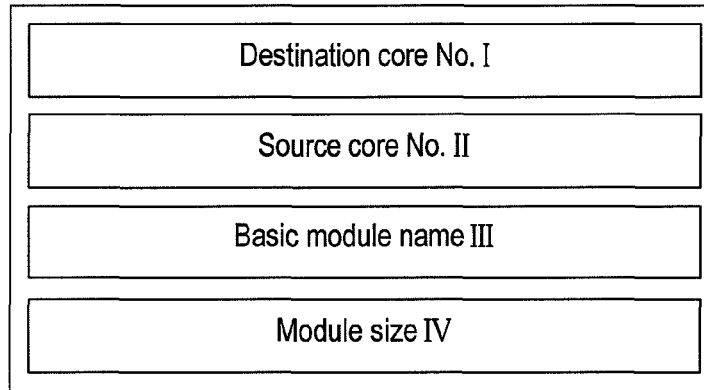
FIG. 15 shows a diagram illustrating an embodiment of a format of a basic module handover request message.

FIG. 15 is an embodiment of a format of the basic module handover request message. In FIG. 15, there are configured destination core No.: I, source core No.: II, basic module name III and module size IV.

The destination core No.: I indicates a core number to which the handover of a basic module is desired.

The source core No.: II indicates a core number from which a basic module is handed over.

The basic module name III indicates a basic module name to be handed over.

The module size IV indicates the program size of a basic module name to be handed over.

Figure 16:
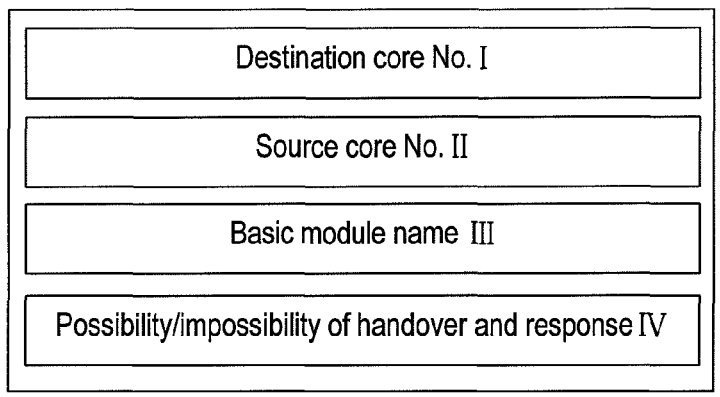
FIG. 16 shows a diagram illustrating an embodiment of a format of a basic module handover response message.

Now, an embodiment of the basic module handover response message is shown in FIG. 16. In FIG. 16, there are configured destination core No.: I, source core No.: II, basic module name III and possibility/impossibility indication IV of handover and response.

The destination core No.: I indicates a core number from which the basic module is handed over.

The source core No.: II indicates the self-core number to which the handover of the basic module is desired.

The basic module name III indicates a basic module name to be handed over.

The possibility/impossibility indication IV of handover and response indicates whether or not handover is possible.

[Format of Basic Module Handover Completion Message]

Figure 17:
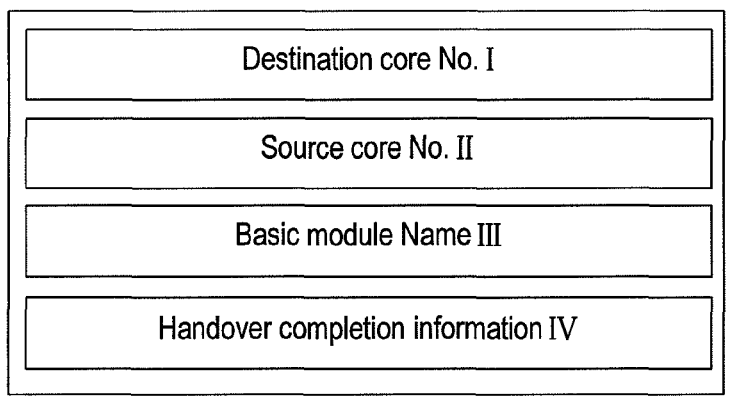
FIG. 17 shows a diagram illustrating a message format at the time of completion of processing by basic module handover and response messages.

FIG. 17 shows a message format at the time of completion of processing by the above-mentioned basic module handover and response messages. As shown in FIG. 17, the basic module handover completion message includes destination core No.: I, source core No.: II, basic module name III and handover completion information IV.

The destination core No.: I indicates a core number from which the basic module is handed over.

The source core No.: II indicates the self-core number to which the handover of the basic module is desired.

The basic module name III indicates a basic module name to be handed over.

The handover completion information IV indicates information whether or not the handover is completed.

[Format of Basic Module Undertaking Request/Response Message]

When a variety of kinds of permission information of module allocation information are received, if the permission of module relocation is indicated, it is possible to relocate the basic module based on a core information data. Assuming a case that more margin is recognized in the processing capacity of the self-core than in the processing capacity of another core from the core information data, processing of undertaking (receiving) by the self-core a portion of the basic module in the other is performed, so as to balance a processing amount.

The formats of an undertaking request message at that time, a response message from the core undertaking the request, and an undertaking completion message of the basic module are described blow.

Figure 18:
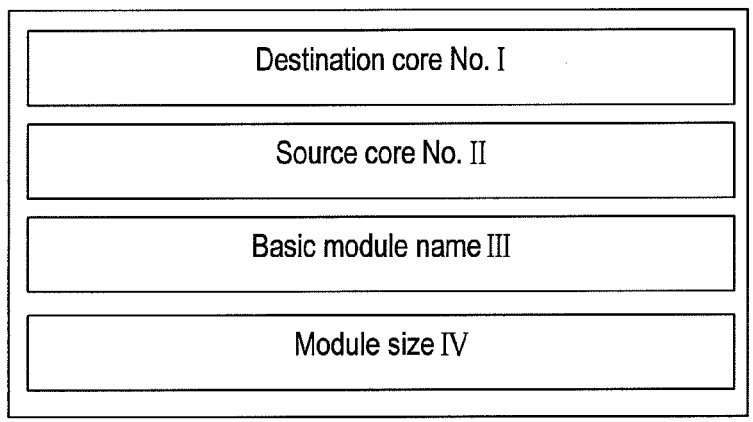
FIG. 18 shows a diagram illustrating a format of a basic module undertaking request message.

FIG. 18 shows a diagram illustrating a format of the basic module undertaking request message, which includes destination core No.: I, source core No.: II, basic module name III and module size IV.

The destination core No.: I indicates a core number to which the undertaking of a basic module is desired.

The source core No.: II indicates a core number in which a basic module is undertaken.

The basic module name III indicates a basic module name to be undertaken.

The module size IV indicates the program size of a basic module name to be undertaken.

Figure 19:
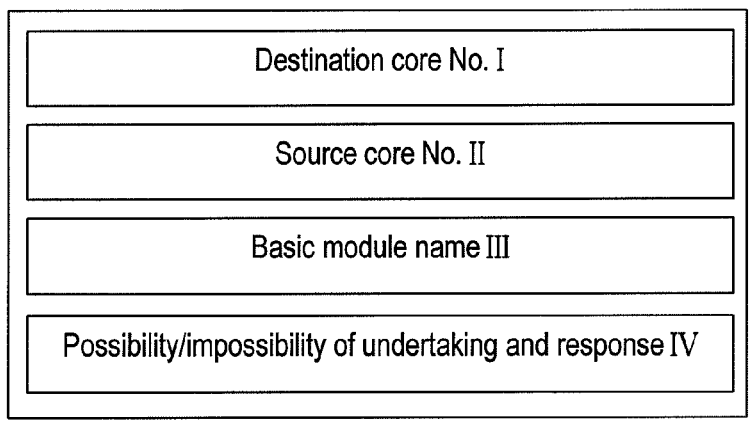
FIG. 19 shows a diagram illustrating an exemplary form of a basic module undertaking response message.

In the following, FIG. 19 shows a diagram illustrating an exemplary form of a basic module undertaking response message. There are configured destination core No.: I, source core No.: II, basic module name III and possibility/impossibility indication IV of undertaking and response.

The destination core No.: I indicates a core number in which the basic module is undertaken.

The source core No.: II indicates the self-core number to which the undertaking of the basic module is desired.

The basic module name III indicates a basic module name to be undertaken.

The possibility/impossibility indication IV of handover and response indicates whether or not undertaking is possible.

Figure 20:
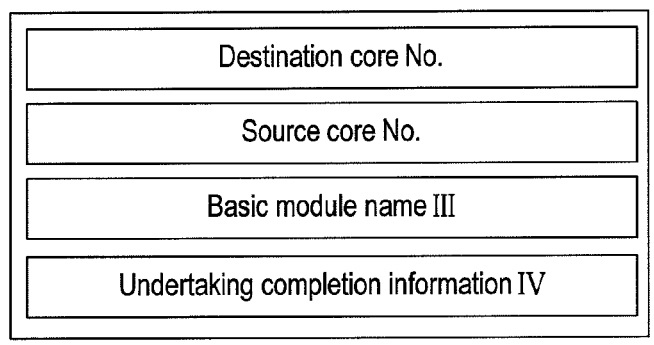
FIG. 20 shows a diagram illustrating a format embodiment of a basic module undertaking completion message.

FIG. 20 shows a diagram illustrating a format embodiment of a basic module undertaking completion message. There are configured destination core No.: I, source core No.: II, basic module name III, and handover completion information IV.

The destination core No.: I indicates a core number in which a basic module is undertaken.

The source core No.: II indicates the self-core number to which the undertaking of a basic module is desired.

The basic module name III indicates a basic module name to be undertaken.

The handover completion information IV indicates information whether or not the undertaking is possible.

[Method for Allocating Basic Module at the Time of Processor Initiation]

Figure 21:
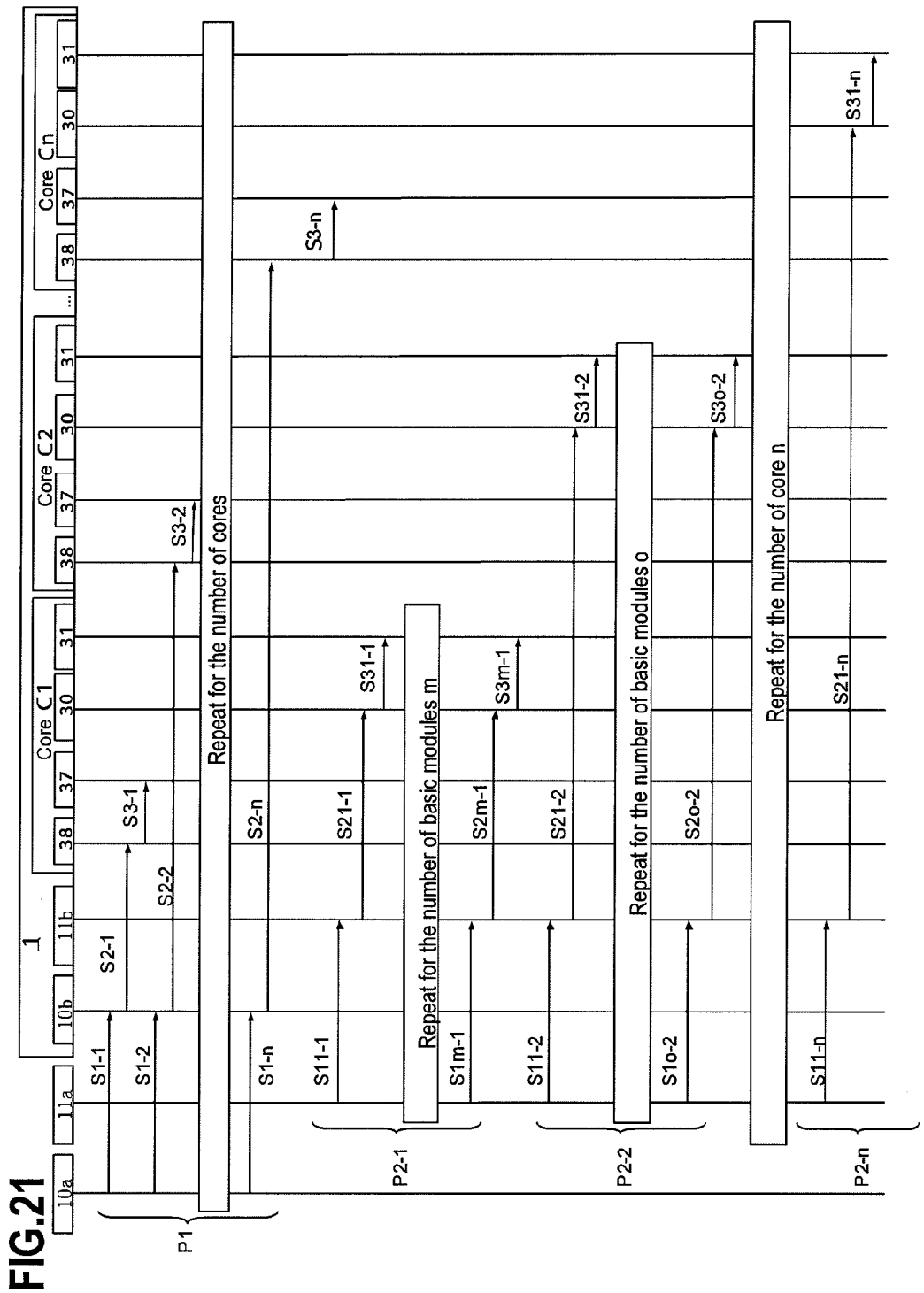
FIG. 21 shows a sequence flow (part 1) in regard to a basic module allocation method at the time of processor initiation.
Figure 22:
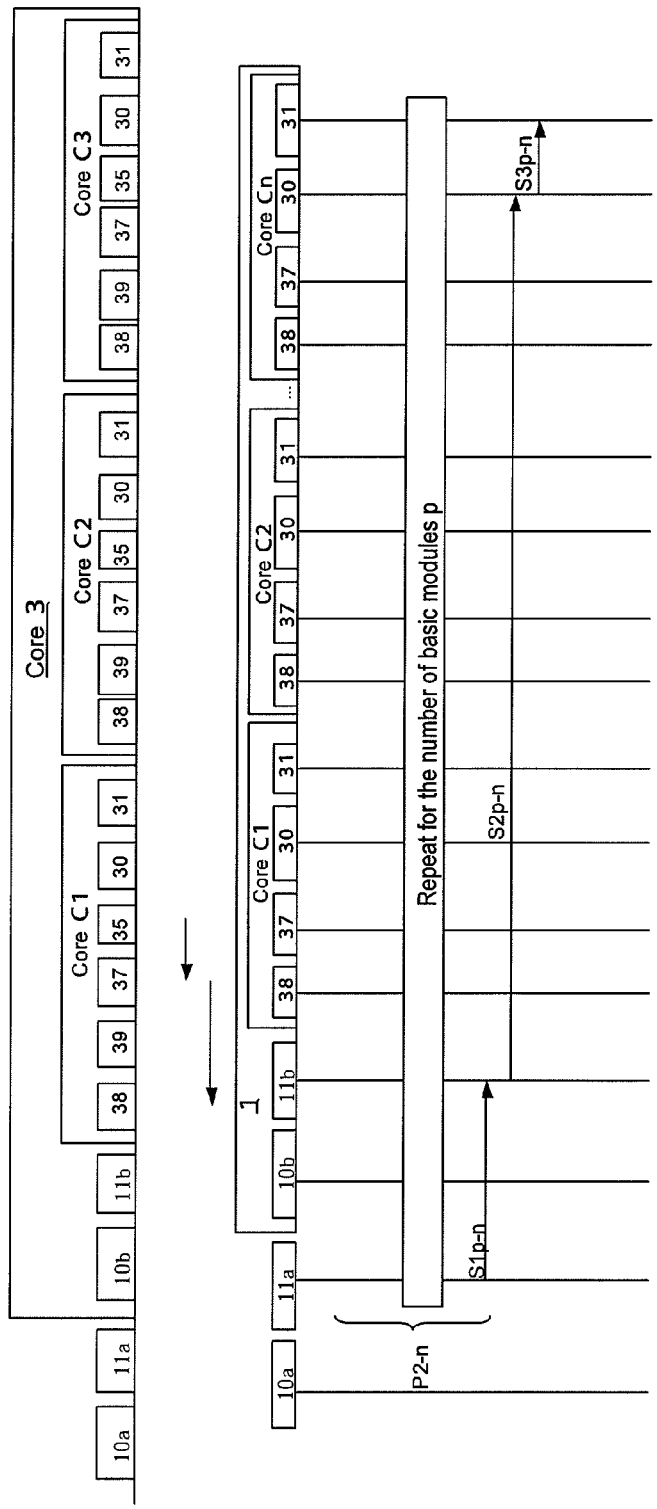
FIG. 22 shows a sequence flow (part 2) in regard to a basic module allocation method at the time of processor initiation.

In regard to the method for allocating a basic module at the time of initiating the processor, which is executed according to the aforementioned corresponding message format, the description is given referring to an embodiment of a sequence flow shown in FIG. 21 (part 1) and FIG. 22 (part 2).

Process P1: From basic module allocation control section 10a outside processor 1, through basic module allocation control section 10b inside processor 1, module allocation information is transmitted to module allocation control section 37 in each core, via communication section 38 in each core.

Process P2: On completion of transmission of module allocation information for the entire number of cores, from basic module transmission section 11a provided outside processor 1, through basic module transmission section 11b provided inside processor 1, a basic module program is allocated into program execution area 31 of each core, through module input/output section 30 provided inside the core. The above process P2 is repeated to each core, for the number of the basic modules corresponding to each core.

For example, for core C1 in FIG. 21, the processing is repeated corresponding to the number m of the basic modules (P2-1).

As such, when the transmission of the basic module programs is completed, preparation of execution is completed.

[Method for Relocating Basic Module in a Core]

In regard to the relocation method of the basic modules in the cores, embodiments are shown below for three operation patterns.

Pattern 1: On the case of handing over a basic module to another core, description is given using an example of handing over a basic module from the core C2 to the core C3.

Processing 1:

The initiation of processor 1 is completed, and the core C2 in normal operation periodically obtains the core information sets of both the core C1, from which an input data is obtained, and the core C3, to which a calculation result data is output.

The above information sets are stored in core information database (DB) 39 of communication section 38. Similarly, the core C2 in normal operation periodically transmits the core information to the core C1, from which the input data is obtained, and to the core C3, to which the calculation result data is output, through core state transmission section 35→module allocation control section 37→communication section 38.

Processing 2:

The core C2 refers to module allocation information shown in FIG. 23 having been obtained when the processor is initiated. In the module allocation information shown in FIG. 23, a core capable of module transmission is identified. Therefore, the information transmitted from the core capable of transmitting the module is compared with the self-core information.

Processing 3:

As core information, each core information set of the core C1, the core C2 and the core C3 is shown in each corresponding FIGS. 24A, 24B, 24C.

As a comparison of the above core information sets, the core C1 and the core C2 are compared according to an input decision algorithm shown in FIG. 25.

In the example of the core information sets of the core C1 and the core C2 respectively shown in FIGS. 24A, 24B, according to the input decision algorithm shown in FIG. 25, it is decided in step S101 that any core is not to be handed over because it is decided that (the transmission buffer output amount)−(the transmission buffer input amount)<0 is not satisfied.

Therefore, standby is continued until either the core information on the input side or the core information of the self-core (the core C2) is updated (step S107).

Now, in the example of core information sets of the core C2 and the core C3 shown in FIGS. 24B, 24C, according to an output decision algorithm shown in FIG. 26, Yes is decided in the entire steps from S111 to S115, and therefore, it is decided that handover to the core C3 is to be made, and a basic module is transmitted to the object core C3 (step S116).

Processing 4:

In the above processing 3, it is fixed that the core C2 is to hand over a basic module 4 to the core C3. Therefore, a basic module handover request message shown in FIG. 27, in which the contents for handing over the basic module 4 to the core C3 are described, is generated in module allocation control section 37 of the core C2, and then transmitted to the core C3 via communication section 38.

Processing 5:

Then, the core C3 receives the basic module handover request message shown in FIG. 27 from module allocation control section 37 via communication section 38, and confirms whether the module size is smaller than an idle capacity of the self-program execution area. When it is confirmed that the module size is smaller, the core C3 generates, in module allocation control section 37, a basic module handover response message shown in FIG. 28, so as to transmit to the core C2 via communication section 38.

Processing 6:

When module allocation control section 37 in the core C2 receives the basic module handover response message of the processing 5 via communication section 38, the core C2 instructs module input/output section 30 to generate a basic module input/output data of the basic module 4 to be forwarded to the core C3, together with an operation suspension instruction of the basic module 4.

Figure 29:
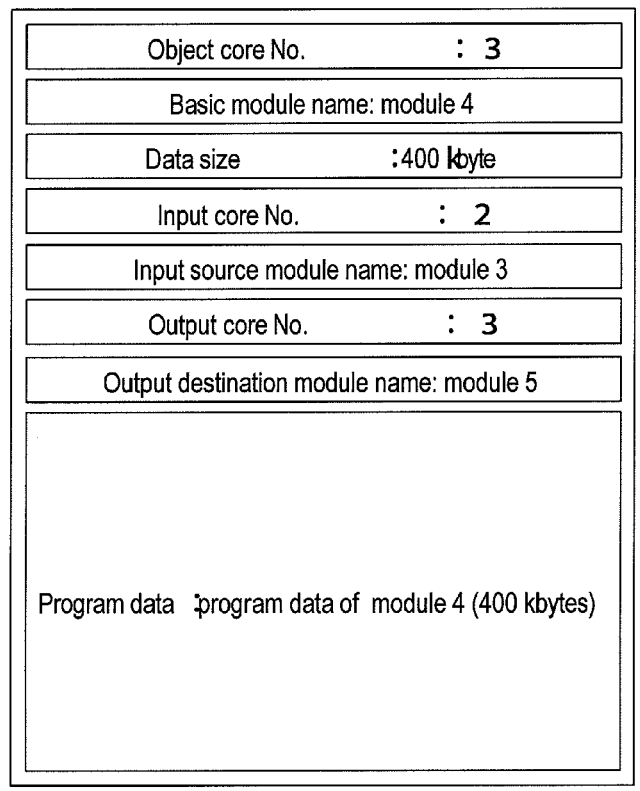
FIG. 29 shows a diagram illustrating basic module input/output data.

Processing 7:

On receiving the instruction, module input/output section 30 in the core C2 executes the operation suspension instruction to the module 4, which has been in operation in program execution area 31, and thereafter, generates a data as shown in FIG. 29 by referring to the basic module input/output data of the module 4 located in program execution area 31, so as to transmit to the core C3.

Processing 8:

When module input/output section 30 in the core C3 receives the basic module input/output data shown in FIG. 29 at the processing 7, the core C3 allocates the basic module 4 of interest in program execution area 31, and starts operation.

Figure 30:
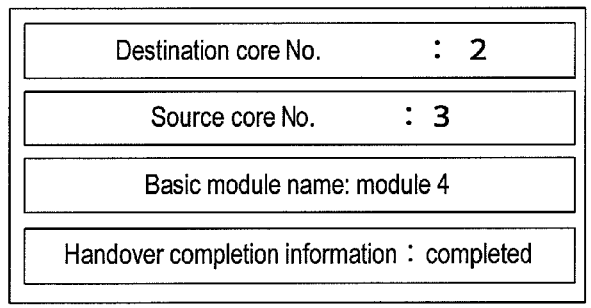
FIG. 30 shows a diagram illustrating a basic module handover response message.

Processing 9:

When being informed from module input/output section 30 in the core C3 that the operation of the basic module 4 is started, module allocation control section 37 in the core C3 transmits a basic module handover completion message shown in FIG. 30 to the core C2, via communication section 38.

Processing 10:

When module allocation control section 37 in the core C2 receives the basic module handover completion message shown in FIG. 30 at the processing 9, via communication section 38, the core C2 instructs module input/output section 30 to delete the module 4 in the operation suspension state, located in program execution area 31.

Processing 11:

In response to the deletion instruction of the module 4, module input/output section 30 in the core C2 executes the deletion of the module 4 in program execution area 31.

Figure 31A:
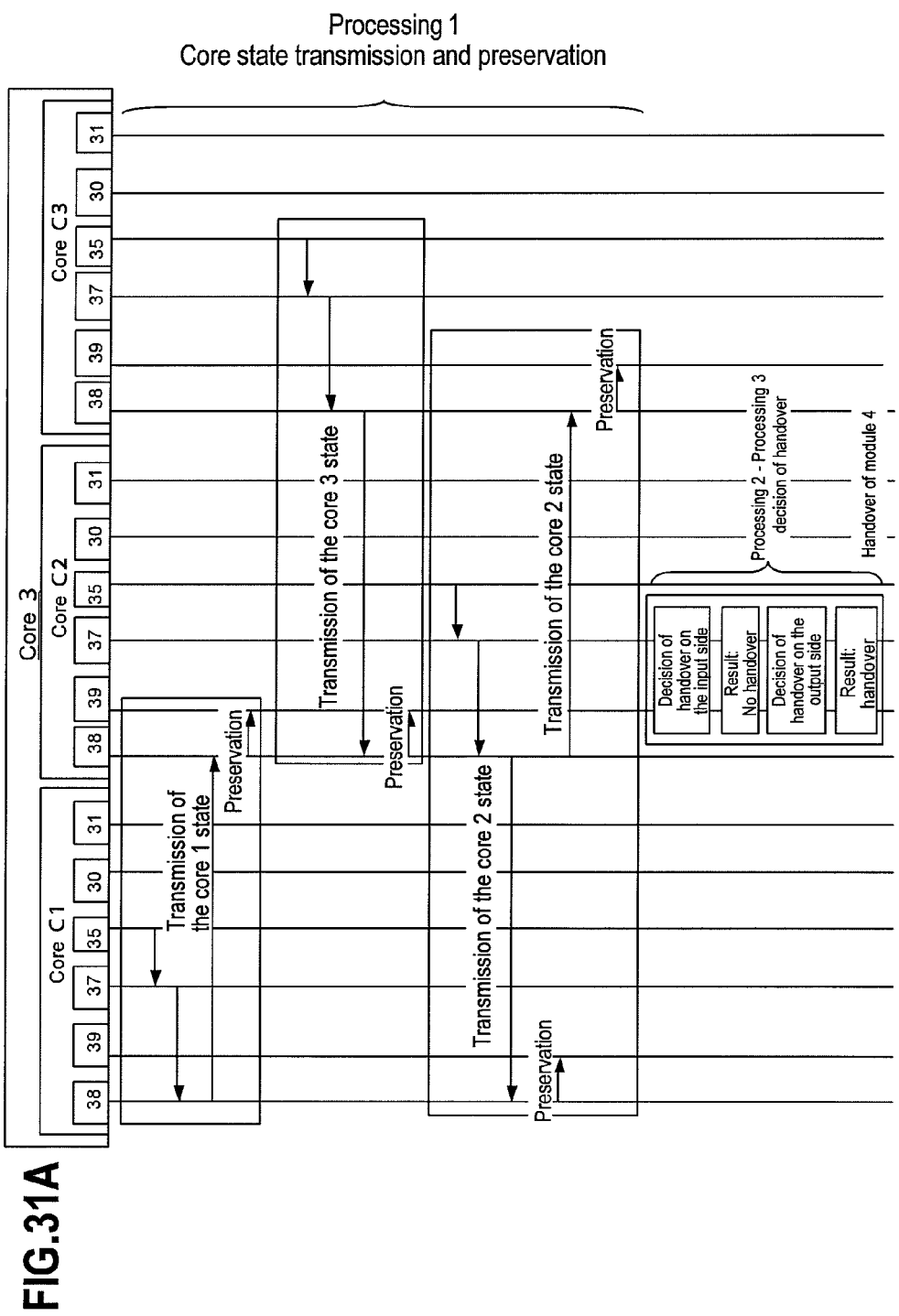
FIG. 31A shows a sequence flowchart (part 1) collecting the contents from the above processing 1 through the processing 11 in case of handing over a basic module to another core.
Figure 31B:
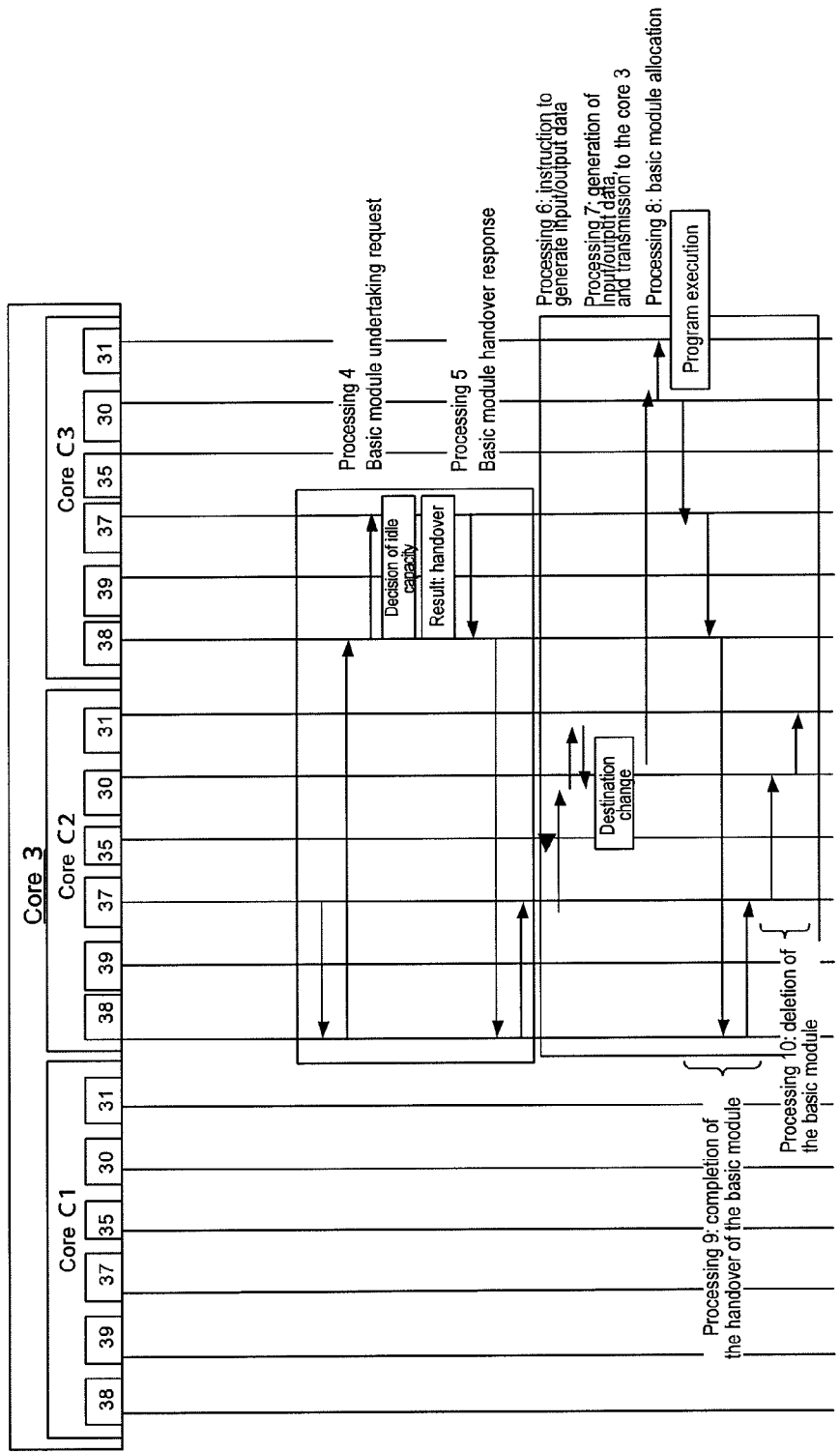
FIG. 31B shows a sequence flowchart (part 2) collecting the contents from the above processing 1 through the processing 11 in case of handing over a basic module to another core.

FIG. 31A (part 1) and FIG. 31B (part 2) show sequence flowcharts collecting the contents from the above processing 1 through the processing 11, in case of handing over a basic module to another core. In FIGS. 31A, 31B, processing numbers correspond to the processing 1 through the processing 11 described above.

Pattern 2: On the case of undertaking a basic module from another core, description is given using an example that the core C2 undertakes a basic module from the core C3.

Processing 21:

The initiation of processor 1 is completed, and a core C2 in normal operation periodically obtains core information sets of both a core C1, from which an input data is obtained, and a core C3, to which a calculation result data is output, and the above information sets are stored in core information database (DB) 39 of communication section 38.

Similarly, the core C2 in normal operation periodically transmits the core information to the core C1, from which the input data is obtained, and to the core C3, to which the calculation result data is output, through core state transmission section 35 module allocation control section 37 communication section 38.

Processing 22:

Based on the module allocation information shown in FIG. 32, which has been obtained when processor 1 is initiated, the core C2 has identified a core capable of module transmission (as an example, the core C1 or the core C3). The core information transmitted from the core concerned is compared with the self-core information.

Processing 23:

As core information, each core information set of the core C1, the core C2 and the core C3 is shown in each corresponding FIGS. 33A, 33B, 33C. Further, as a comparison of the above core information sets, the core C1 and the core C2 are compared according to an input side decision algorithm shown in FIG. 34.

Processing 23:

In the example of the core information sets of the core C1 and the core C2 respectively shown in FIGS. 33A, 33B, according to the input side decision algorithm shown in FIG. 34, in the decision of step S202, namely, in the core information of the self-core, it is decided that any core is not to be undertaken because (the reception buffer output amount)−(the reception buffer input amount)>0 is not satisfied. Therefore, standby is continued until either the core information on the input side or the core information of the self-core (the core C2) is updated (step S207).

Figure 35:
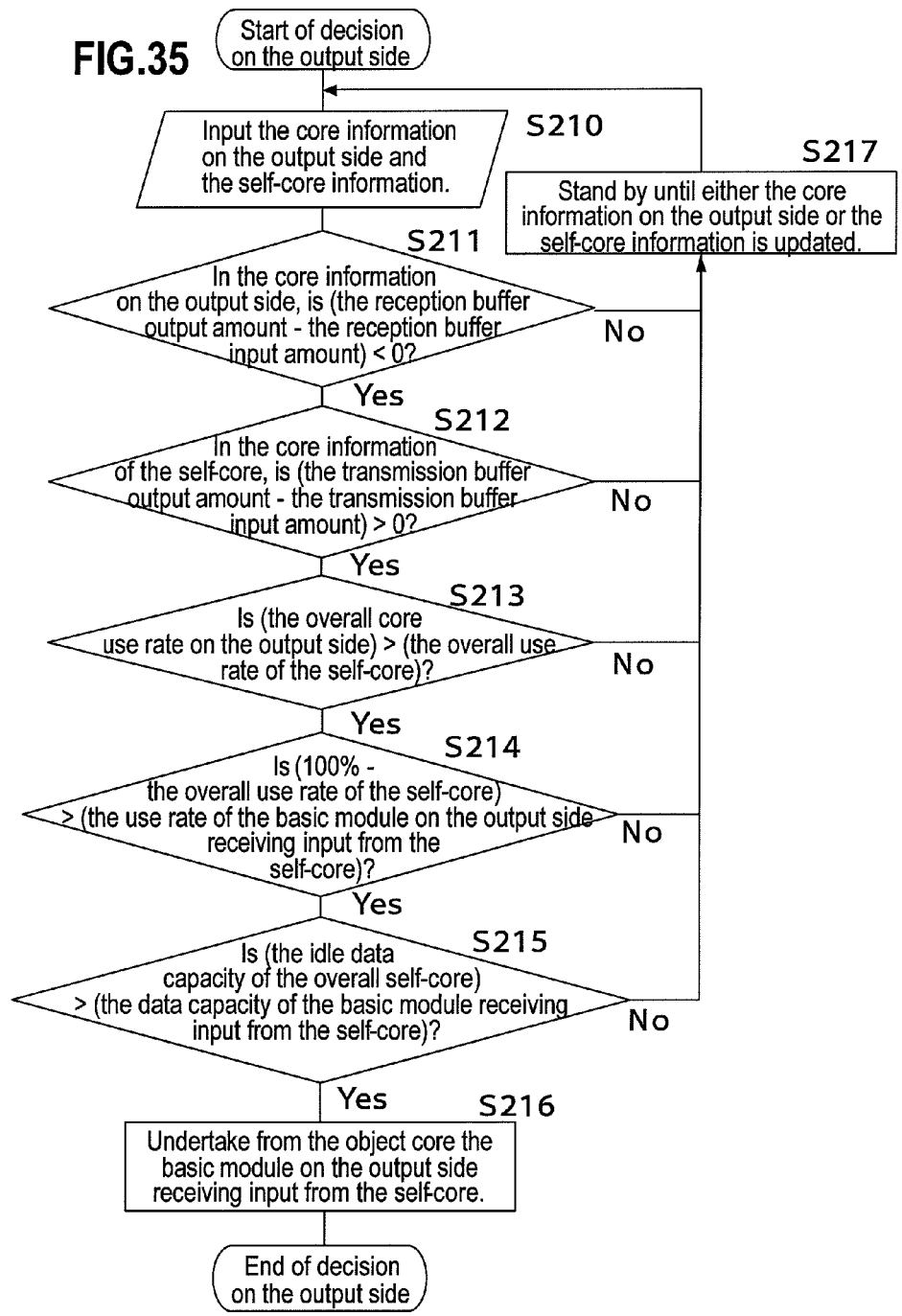
FIG. 35 shows a diagram illustrating an output side decision algorithm.

Now, in the example of core information sets of the core C2 and the core C3 shown in FIGS. 33B, 33C, according to an output side decision algorithm shown in FIG. 35, Yes is decided in the entire steps from S211 to S215, and therefore, it is decided that a basic module, which is outputting to the self-core on the input side, is undertaken from the object core C3 (step S216).

Processing 24:

In the above processing 23, it is fixed that the core C2 is to undertake a basic module 5 located in the core C3, according to the output side decision algorithm shown in FIG. 35. Therefore, a basic module undertaking request message shown in FIG. 36, in which the contents for undertaking the basic module 5 is described, is generated in module allocation control section 37 of the core C2, and then transmitted to the core C3 via communication section 38.

Processing 25:

Then, in module allocation control section 37, the core C3 receives the basic module undertaking request message shown in FIG. 36, via communication section 38, and confirms whether the module size is identical to the corresponding module 5 in the self-program execution area 31. When it is confirmed that the module size is identical, the core C3 generates, in module allocation control section 37, a basic module undertaking response message the core C2 shown in FIG. 37, so as to transmit to the core C2 via communication section 38.

Processing 26:

When module allocation control section 37 in the core C2 receives the basic module undertaking response message of the processing 25 via communication section 38, the core C2 informs module input/output section 30 that an additional module is to be transmitted.

Processing 27:

After transmitting the basic module undertaking response message, the core C3 instructs module input/output section 30 to generate a basic module input/output data of the basic module 5 to be forwarded to the core C2, together with an operation suspension instruction of the basic module 5. On receiving the instruction, module input/output section 30 executes the operation suspension instruction to the module 5, which has been in operation in program execution area 31, and thereafter, generates a data as shown in FIG. 38, by referring to the basic module input/output data of the module 5 in program execution area 31, so as to transmit to the core C2.

Processing 28:

When module input/output section 30 in the core C2 receives the basic module input/output data shown in FIG. 38 at the processing 27, the core C2 allocates the basic module of interest in program execution area 31, and starts operation.

Processing 29:

When being informed from module input/output section 30 that the operation of the basic module 5 is started, module allocation control section 37 in the core C2 transmits a basic module undertaking completion message shown in FIG. 39 to the core C3, via communication section 38.

Processing 30:

When module allocation control section 37 in the core C3 receives the basic module undertaking completion message shown in FIG. 39 at the processing 29, via communication section 38, the core C3 instructs module input/output section 30 to delete the module 5 in the operation suspension state, located in program execution area 31.

Processing 31:

In response to the module deletion instruction, module input/output section 30 in the core C3 executes the deletion of the module 5 in program execution area 31.

Figure 40A:
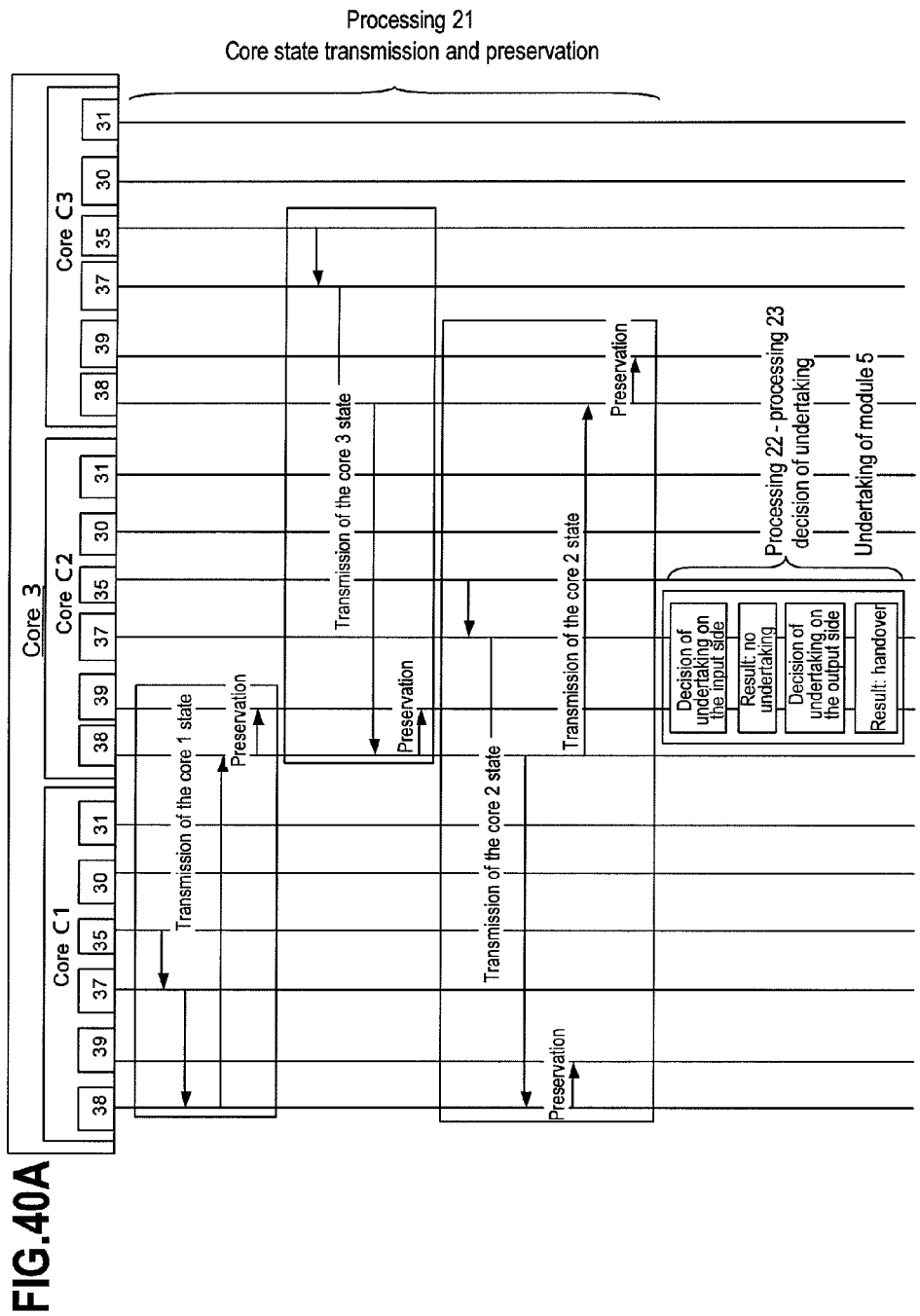
FIG. 40A shows a sequence flowchart (part 1) when undertaking a basic module from another core.
Figure 40B:
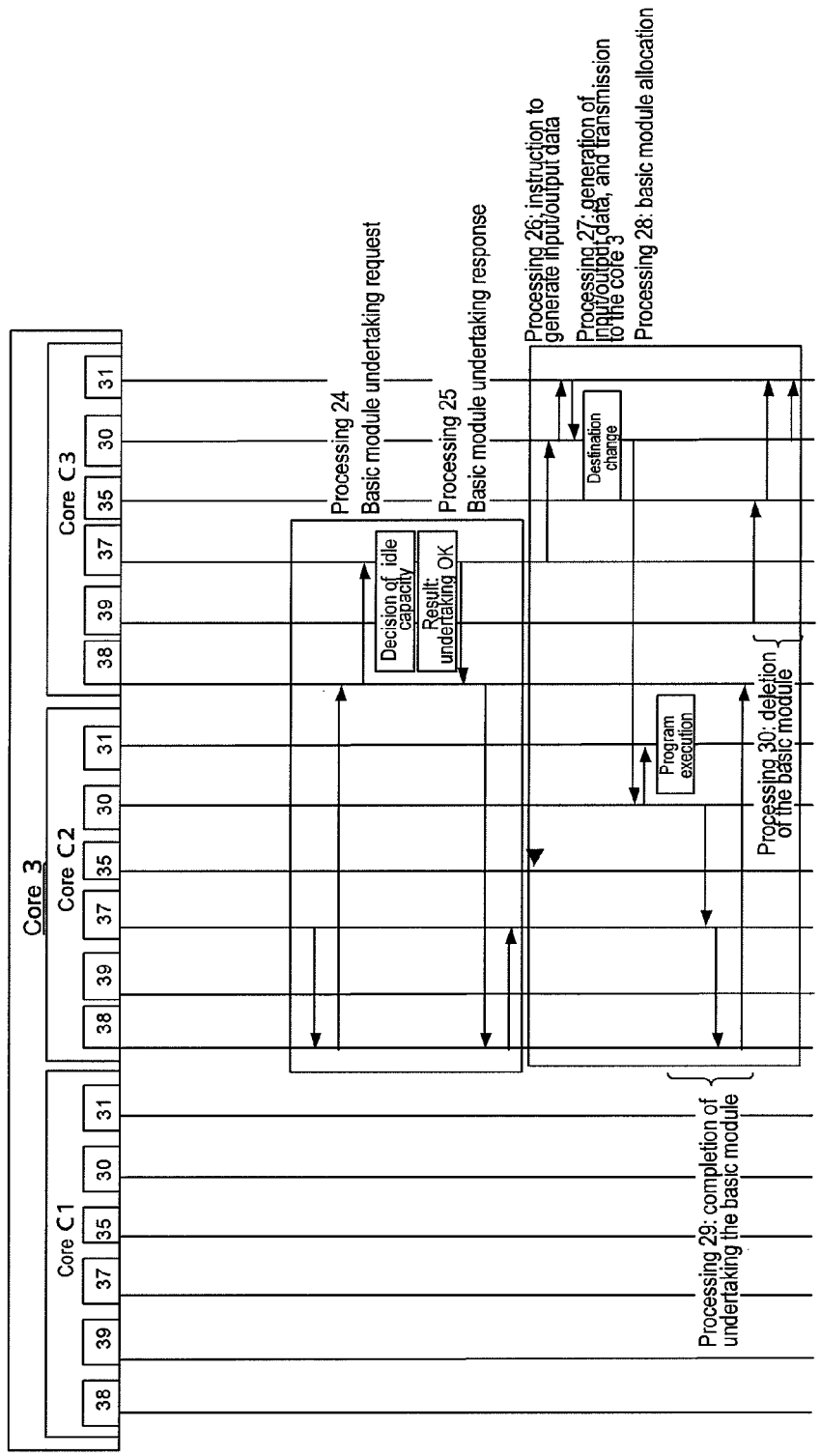
FIG. 40B shows a sequence flowchart (part 2) when undertaking a basic module from another core.

FIG. 40A (part 1) and FIG. 40B (part 2) show sequence flowcharts collecting the contents of the above processing 21 through the processing 31 in case of undertaking a basic module from another core. The processing numbers shown in FIGS. 40A and 40B correspond to the processing 21 through the processing 31 described above.

Pattern 3: On the case of occurrence of module saving to other cores, description is given using an example of handing over each basic module from the core C2 to the core C1 and the core C3.

Processing 41:

The initiation of processor 1 is completed, and a core C2 in normal operation periodically obtains core information sets of both a core C1, from which an input data is obtained, and a core C3, to which a calculation result data is output, and the above information sets are stored in core information database (DB) 39 of communication section 38. Similarly, the core C2 in normal operation periodically transmits the core information to the core C1, from which the input data is obtained, and to the core C3, to which the calculation result data is output, through core state transmission section 35→module allocation control section 37→communication section 38.

Processing 42:

When the core C2 has to save a module under specific conditions, module allocation information shown in FIG. 41 is transmitted to the core C2 from basic module allocation control section 10a outside the processor, via basic module allocation control section 10b inside the processor.

Processing 43:

Based on the module allocation information shown in FIG. 41, which has been obtained at the time of initiating the processor, the core C2 has identified a core capable of module transmission (as an example, the core C1 or the core C3). The core information transmitted from the core concerned is compared with the self-core information. The respective core information sets of the core C1, the core C2 and the core C3 at that time are as shown in FIG. 24A (the core information of the core C1 on the input side), FIG. 24B (the core information of the self-core C2) and FIG. 24C (the core information of the core C3 on the output side) shown before.

Processing 44:

Based on the above core information sets, decision is made according to a saving decision algorithm shown in FIG. 42, resulting in that a module 3 is to be handed over to the core C1, and a module 4 is to be handed over to the core C3.

Processing 45:

In the process of the processing 44, the core C2 is to hand over the module 3 to the core C1, and also hand over the module 4 to the core C3. With this, a basic module handover request message (1) shown in FIG. 43A, in which the contents for handing over the basic module 3 to the core C1 are described, is generated in module allocation control section 37 of the core C2, and transmitted to the core C1 via communication section 38. Similarly, a basic module handover request message (2) shown in FIG. 43B, in which the contents for handing over the basic module 4 to the core C3 are described, is generated in module allocation control section 37 of the core C2, and transmitted to the core C3 via communication section 38.

Processing 46:

On receiving the basic module handover request messages, generated in the processing 45, via communication section 38, the core C1 and the core C3 respectively confirm that each module size is smaller than an idle capacity of each self-program execution area 31.

When each module size is confirmed to be smaller, each module allocation control section 37 generates each basic module handover response message to the core C2, shown in FIGS. 44A (for transmission from the core C1), 44B (for transmission from the core C3), so as to transmit to the core C2 via communication section 38.

Processing 47:

Module allocation control section 37 in the core C2 receives the two basic module handover response messages, shown in FIGS. 44A, 44B at the processing 46, via communication section 38. Subsequently, the core C2 instructs module input/output section 30 to generate basic module input/output data of the basic module 3 and the basic module 4, to be forwarded to the core C1 and the core C3, together with operation suspension instructions of the basic modules 3 and 4.

Processing 48:

On receiving the instruction, module input/output section 30 in the core C2 executes the operation suspension instructions to the module 3 and the module 4 having been in operation in program execution area 31. Thereafter, by referring to the basic module input/output data of the module 3 and the module 4 located in program execution area 31, module input/output section 30 generates basic module input/output data shown in FIGS. 45A, 45B, so as to transmit to the core C1 and the core C3.

FIG. 45A shows the basic module input/output data for transmission to the core C1, and FIG. 45B shows the basic module input/output data for transmission to the core C3.

Processing 49:

Module input/output sections 30 in the core C1 and the core C3 receive the basic module input/output data of the processing 48, allocate the basic modules concerned into each program execution area 31, and start operation.

Processing 50:

When being informed from each module input/output section 30 that operation of the basic module 3 and the basic module 4 is started, module allocation control sections 37 in the core C1 and the core C3 transmit to the core C2 basic module handover completion messages shown in FIGS. 46A, 46B, via communication section 38.

FIG. 46A shows the basic module handover completion message for the core C1, and FIG. 46B shows the basic module handover response message for the core C3.

Processing 51:

When module allocation control section 37 in the core C2 receives the two basic module handover completion messages of the processing 50 via communication section 38, the core C2 instructs module input/output section 30 to delete the module 4 and the module 5 in the operation suspension state, located in program execution area 31.

Processing 52:

On receiving the module deletion instructions of the processing 51, module input/output section 30 in the core C2 executes the deletion of the module 3 and the module 4 in program execution area 31.

Figure 47B:
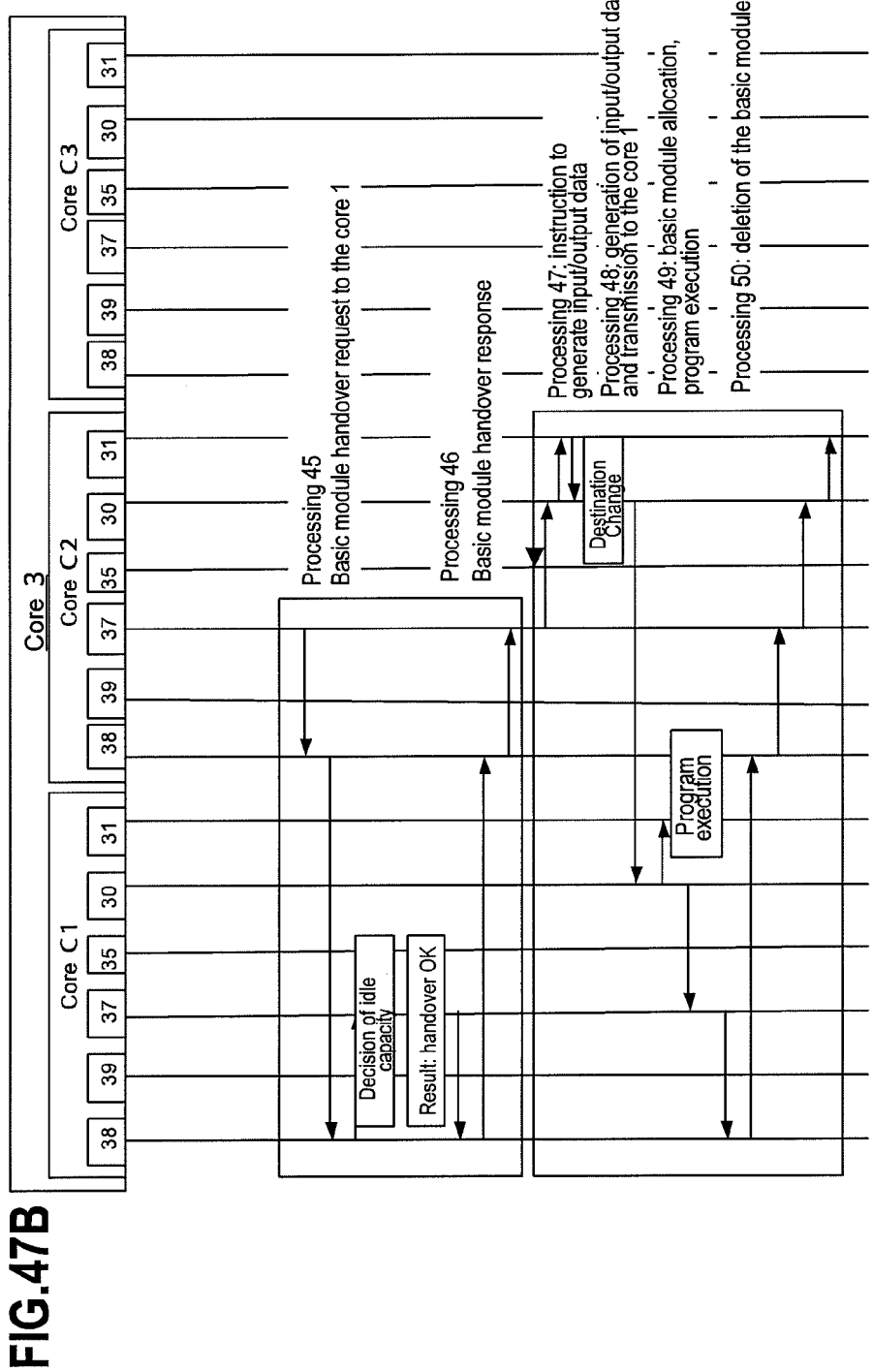
FIG. 47B shows a sequence flow (part 2) corresponding to the processing of pattern 3.
Figure 47C:
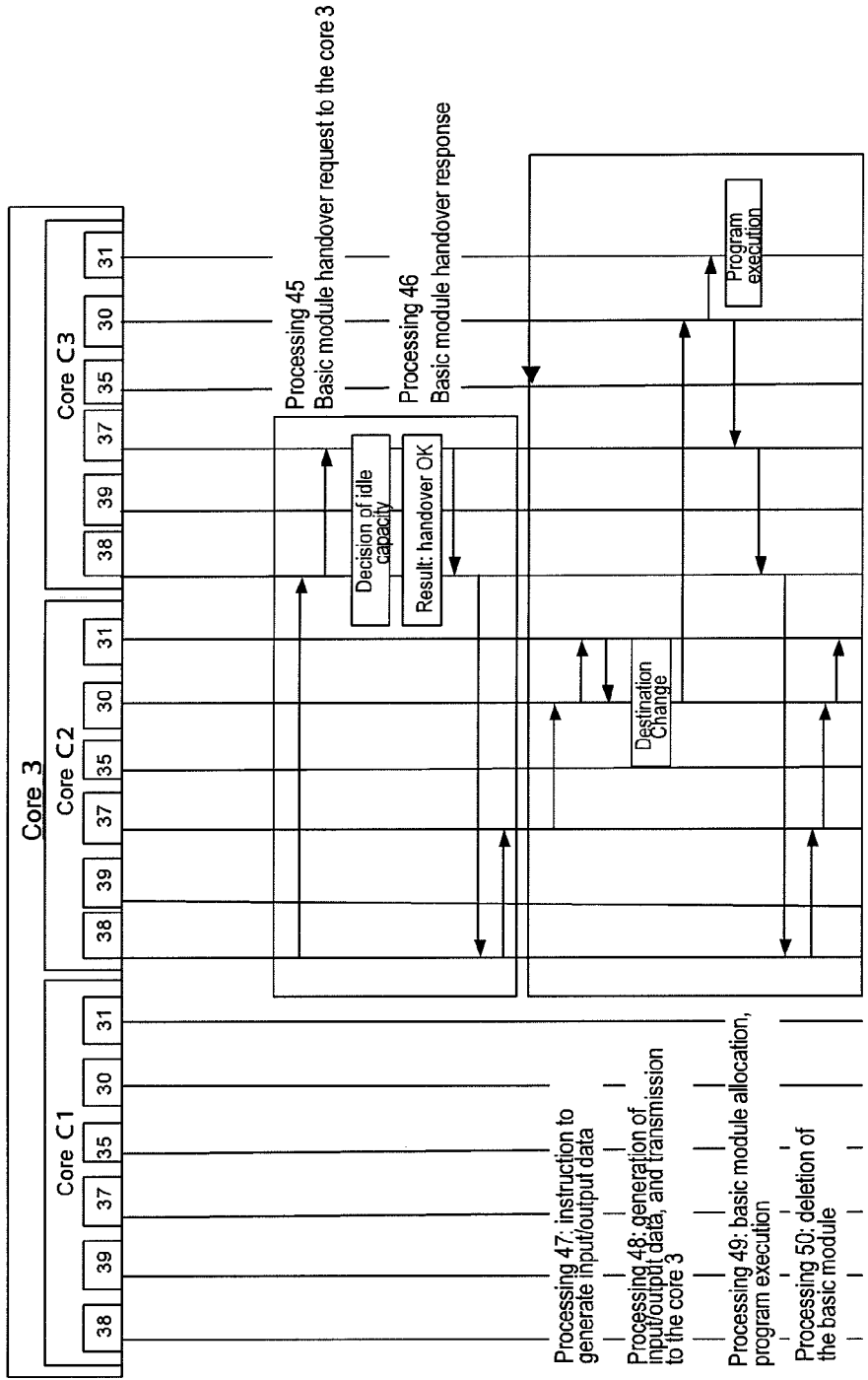
FIG. 47C shows a sequence flow (part 3) corresponding to the processing of pattern 3.

FIG. 47A (part 1), FIG. 47B (part 2) and FIG. 47C (part 3) show collected sequence flow corresponding to the above-mentioned processing 41 through the processing 52. The processing numbers in the sequence flow correspond to the above-mentioned processing 41 through the processing 52.

Industrial Applicability

As the embodiments of the present invention have been described, each basic module is configured in such a manner that processing contents required for the overall processor are divided into minimum configuration units each having a uniform input/output format interface.

By mounting one or more functions capable of grasping information, such as the use rate of the self-core, each core in the multiprocessor is configured to relocate the basic modules either periodically or depending on the necessity, based on the above information.

With this, it is possible to automatically decide the processing content for each core, by appropriately controlling the processing contents of each core so as to fit to a present processing state. Further, it is possible to establish an efficient processing allocation algorithm which is easy for software engineers and necessary for the decision of allocation of processing to each core.

Therefore, the present invention enables dynamic resource allocation in the multiprocessor under temporally varying load conditions of each application, and greatly contributes to the industry.

The foregoing description of the embodiments is intended for the understanding of the present invention. The technical scope of the present invention is not to be limited to the above description of the embodiments, but instead is covered by the appended claims and all the equivalents thereof.

What is claimed is:

1. A processing load distribution method in a multi-core processor having a plurality of cores, comprising:
    forming a plurality of basic modules, including processing contents required for the overall processor being divided into minimum configuration units each having a unified input/output format interface;
    as initial allocation, allocating in distribution the plurality of basic modules to the plurality of cores; and
    subsequently, based on functional information of the each core, relocating by respective cores, the plurality of initially allocated basic modules either periodically or at appropriate timing,
    wherein the functional information of each core is information obtained from the functions of: i) counting the number of signals requested to the self-core and the number of signals being output from the self-core to other cores; ii) measuring a reception buffer storage capacity and a transmission buffer storage capacity incorporated in the self-core; and iii) measuring the number of queues requested to the self-core and the number of queues requested to other cores.

2. The processing load distribution method in the multi-core processor according to claim 1,
    wherein, the plurality of basic modules are relocated in a manner such that a processing capacity of each core comes to have a maximum value for each of the plurality of basic modules, using the entire plurality of cores.

3. The processing load distribution method in the multi-core processor according to claim 1,
    wherein the plurality of basic modules are relocated by means that, among the plurality of cores, a core having a high use priority undertakes a basic module in a core having a low use priority.

4. The processing load distribution method in the multi-core processor according to claim 1,
    wherein, by leaving at least one core among the plurality of cores, the plurality of basic modules are relocated to other cores in a manner such that a processing capacity of each core comes to have a maximum value for each of the plurality of basic modules.

5. A multi-core processor having a plurality of cores, comprising:
    a core section having the plurality of cores; and
    a processor section, wherein
    the processor section executes processes comprising:
    transferring a processing object data received from the outside to each core in the core section;
    transmitting a data being output to the outside, from the core section to the outside;
    deciding to which of the plurality of cores the basic module transmitted from the outside is to be allocated, and performing relocation processing of the basic module to the object core; and
    informing the entire plurality of cores about a relocation control method specified from the outside,
    wherein, as initial allocation, the plurality of basic modules are allocated in distribution to the plurality of cores,
    wherein, based on the functional information of each core, respective cores relocate the plurality of initially allocated basic modules either periodically or at appropriate timing, and
    wherein the functional information of each core is information obtained from the functions of: i) counting the number of signals requested to the self-core and the number of signals being output from the self-core to other cores; ii) measuring a reception buffer storage capacity and a transmission buffer storage capacity incorporated in the self-core; and iii) measuring the number of queues requested to the self-core and the number of queues requested to other cores.

6. The multi-core processor according to claim 5, wherein, the plurality of basic modules are relocated so that a processing capacity of each core comes to have a maximum value for each of the plurality of basic modules, using the entire plurality of cores.

7. The multi-core processor according to claim 5, wherein, among the plurality of cores, a core having a high use priority undertakes a basic module in a core of low use priority, so that the plurality of basic modules are relocated.

8. The multi-core processor according to claim 5, wherein, among the plurality of cores, at least one core is left, and the plurality of basic modules are relocated to other cores so that a processing capacity of each core comes to have a maximum value for each of the plurality of basic modules.

9. The multi-core processor according to claim 5, wherein each of the plurality of cores in the core section executes processes comprising:

inputting /outputting a data;

measuring an input buffer amount and an output buffer amount in the data input/output section;

having the basic modules allocated therein; and measuring a use rate of the overall program execution area and a use rate per basic module, and each of the plurality of cores executes processes comprising:

outputting a core state based on the input buffer amount and the output buffer amount, measured by the buffer measurement section, and the program execution area use rate, measured by the core use rate measurement section;

describing state information of other cores obtained through a communication section; and comparing the self-core state, transmitted from the core state transmission section, with a state of another core described in the information database, taking charge of execution of processes before and after the basic module allocated in the self-core, and performing relocation control of the basic modules when a difference exists between the overall core use rates.

\* \* \* \* \*